(12) United States Patent
Lancioni et al.

(10) Patent No.: US 12,717,879 B2
(45) Date of Patent: Aug. 25, 2026

(54) TARGETED CLUSTERING USING META-BUCKETS

(71) Applicant: McAfee, LLC, San Jose, CA (US)

(72) Inventors: German Lancioni, San Jose, CA (US); Steve L. Grobman, Flower Mound, TX (US); Jonathan B. King, Hillsboro, OR (US)

(73) Assignee: McAfee, LLC, San Jose, CA (US)

( * ) Notice: Subject to any disclaimer, the term of this patent is extended or adjusted under 35 U.S.C. 154(b) by 410 days.

(21) Appl. No.: 18/401,180

(22) Filed: Dec. 29, 2023

(65) Prior Publication Data

US 2024/0311174 A1 Sep. 19, 2024

Related U.S. Application Data

(60) Provisional application No. 63/452,738, filed on Mar. 17, 2023.

(51) Int. Cl.

| | |
|---|---|
| ***G06F 18/24*** | (2023.01) |
| ***G06F 18/232*** | (2023.01) |
| ***G06F 21/56*** | (2013.01) |

(52) U.S. Cl.

CPC ............ *G06F 18/24* (2023.01); *G06F 18/232* (2023.01); *G06F 21/56* (2013.01); *G06F 2221/034* (2013.01)

(58) Field of Classification Search

CPC ........ G06F 18/24; G06F 18/232; G06F 21/56; G06F 2221/034

See application file for complete search history.

(56) References Cited

U.S. PATENT DOCUMENTS

| | | | | |
|---|---|---|---|---|
| 8,352,494 | B1 * | 1/2013 | Badoiu | G06F 16/532 707/780 |
| 9,686,173 | B1 * | 6/2017 | Giordano | H04L 43/0876 |
| 10,437,996 | B1 * | 10/2019 | Li | G06F 16/245 |
| 12,141,282 | B2 * | 11/2024 | Lancioni | G06F 21/56 |
| 12,425,425 | B2 * | 9/2025 | Healy | G06N 20/00 |
| 2006/0004754 | A1 * | 1/2006 | Aggarwal | G06F 16/24568 |

(Continued)

OTHER PUBLICATIONS

D. Besiris et al., "Key frame extraction in video sequences: a vantage points approach," 2007 IEEE 9th Workshop on Multimedia Signal Processing, Chania, Greece (Year: 2007).*

(Continued)

*Primary Examiner* — Benjamin C Wu
(74) *Attorney, Agent, or Firm* — Patent Capital Group

(57) ABSTRACT

There is disclosed a computer-implemented system and method of classifying a target sample, wherein the target sample is a computer object having a feature vector, the method comprising: creating n sorted containers, comprising sorting a universe of samples based on feature vector distances from the samples to n vantage points, wherein n is a positive integer; storing the n sorted containers to a computer memory; bucketizing the n sorted containers; for the n vantage points, selecting, from the n bucketized sorted containers, n meta-buckets of that the target sample belongs to; creating an intersection container, comprising samples that appear in all n meta-buckets; selecting, as a target cluster, samples from the intersection container that have a feature vector distance from the target sample less than a threshold; and acting on the target cluster.

20 Claims, 22 Drawing Sheets

(56) References Cited

U.S. PATENT DOCUMENTS

2007/0043565 A1* 2/2007 Aggarwal ............. G10L 15/063 704/245
2008/0205774 A1* 8/2008 Brinker ................. G06F 16/353 382/225
2013/0151535 A1* 6/2013 Dusberger .......... G06F 16/2272 707/E17.049
2013/0325862 A1 12/2013 Black
2014/0229307 A1* 8/2014 Kallumadi ......... G06Q 30/0601 705/26.1
2014/0229473 A1* 8/2014 Mehrotra ............ G06F 16/3347 707/780
2015/0227796 A1* 8/2015 Holzschneider ....... G06V 20/20 382/103
2016/0028762 A1* 1/2016 Di Pietro ............ H04L 63/1416 726/23
2016/0359680 A1* 12/2016 Parandehgheibi .. G06F 9/45558
2017/0365155 A1* 12/2017 Borutta .................. G06N 20/00
2018/0198800 A1* 7/2018 Krasser ............... H04L 63/1416
2018/0232700 A1 8/2018 Li et al.
2019/0026466 A1* 1/2019 Krasser ................. G06F 21/566
2019/0098039 A1* 3/2019 Gates ..................... G16H 50/20
2019/0102155 A1 4/2019 Garvey et al.
2019/0138786 A1* 5/2019 Trenholm ............. G06F 18/241
2019/0341026 A1* 11/2019 Visser ..................... G10L 25/63
2021/0055117 A1 2/2021 Dong et al.
2021/0097334 A1* 4/2021 Healy ...................... G06N 5/01
2021/0103969 A1* 4/2021 Sollami ................ G06N 3/0464
2021/0110197 A1* 4/2021 Zamora Esquivel ........................ G06N 3/0442
2021/0248446 A1* 8/2021 Hughes .................. G06N 3/045
2021/0342447 A1* 11/2021 Sanzgiri .............. H04L 63/1441
2021/0344696 A1* 11/2021 Lancioni ............. G06F 16/2255
2021/0373543 A1* 12/2021 Petladwala ........ G05B 23/0221
2022/0012268 A1* 1/2022 Ghoshal ................... G06N 5/04
2023/0205823 A1* 6/2023 Chang ................. G06F 16/9027 707/737
2024/0045928 A1* 2/2024 Burke ..................... G06F 21/56
2024/0311174 A1* 9/2024 Lancioni ............. G06F 9/45558
2024/0311443 A1* 9/2024 Lancioni ............. G06F 9/45558
2024/0338438 A1 10/2024 Yen et al.
2025/0013748 A1* 1/2025 Lancioni ............... G06F 21/562
2025/0047696 A1* 2/2025 Goel ..................... H04L 9/3239
2025/0358337 A1* 11/2025 Urmanov .......... G06F 18/23213

OTHER PUBLICATIONS

Uno et al., "Micro-Clustering: Finding Small Clusters in Large Diversity," arXiv.org, Jun. 6, 2016, 24 pages, XP093194345, DOI: 10.48550/arxiv.1507.03067v2 Retrieved from the Internet: URL:https://arxiv.org/pdf/1507.03067 [retrieved on Aug. 12, 2024].

* cited by examiner (5) SOME SAMPLES REMAIN UNCLUSTERED

TARGETED CLUSTERING USING META-BUCKETS

CROSS REFERENCE TO RELATED APPLICATIONS

This application claims priority to U.S. Provisional Application No. 63/452,738, titled "Targeted Real-Time Clusters," filed Mar. 17, 2023, which is incorporated herein by reference.

FIELD OF THE SPECIFICATION

This application relates in general to computer security, and more particularly though not exclusively to a system and method for providing targeted clustering of objects.

BACKGROUND

Modern computing ecosystems often include "always on" broadband internet connections. These connections leave computing devices exposed to the internet, and the devices may be vulnerable to attack.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

SUMMARY

Figure 1:
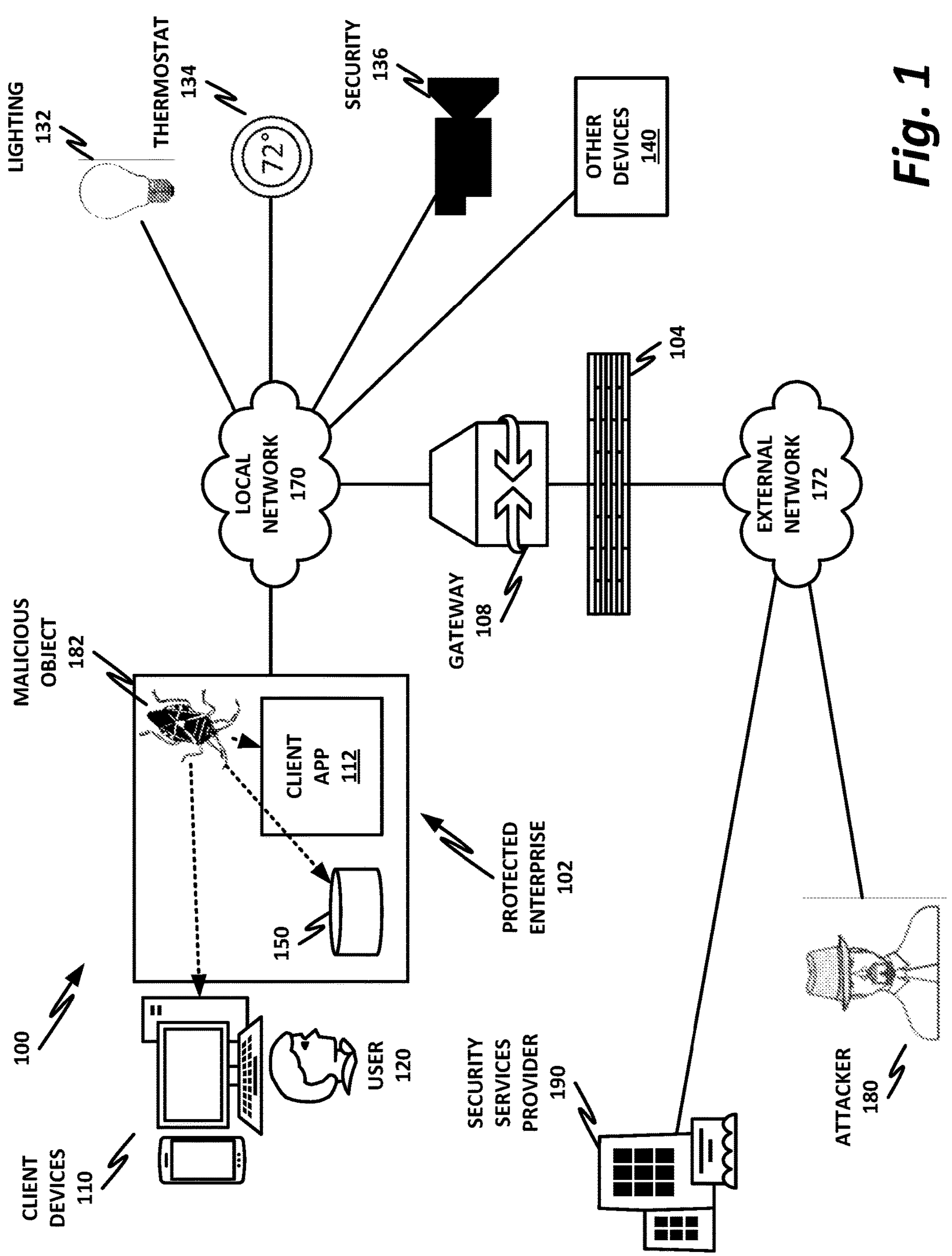
FIG. 1 is a block diagram of selected elements of a security ecosystem.

A computer-implemented system and method of clustering a universe of featurized objects into micro-clusters includes selecting a vantage point having a feature vector; computing, for the featurized objects in the universe, respective distances from the vantage point, and sorting the featurized objects into a sorted container based on their distances from the vantage point; clustering adjacent objects into a plurality of micro-clusters based on determining that objects have a distance from a next adjacent object less than a maximum distance; and storing the micro-clusters onto a tangible computer-readable medium to modify operation of a computing apparatus based on objects in the micro-clusters.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Overview

Clustering is a machine learning (ML) technique useful for identifying similarities between sample objects. In general terms, a clustering system may start by building a feature vector for each object, wherein various attributes of the object are quantified. The feature vector thus provides an array of numerical values (commonly real, floating-point values), with each value representing an attribute of the object. The system may then compute the "distance" between two objects by calculating a scalar distance between their feature vectors. Two objects that have a short distance are similar, while two objects that have a long distance are dissimilar. This may provide a more flexible comparison of objects than, for example, hashing, which is best at detecting objects that are identical to one another.

Once objects are featurized, the clustering system may compute the distances between objects, for example using a location-sensitive hashing (LSH) algorithm such as MinHash or TLSH. By computing a scalar distance between objects, the system can determine which objects are most similar to one another. Those objects can then be "clustered" based on their proximity to one another. In some cases, clustering is based on selecting all samples within a minimum distance (MIN_DISTANCE, sometimes also ε) of a sample, and then performing the same operation on the selected samples. This can form large data structures of clusters, with hundreds or thousands of objects in a cluster, for example. One limitation of clustering is that, given such a data structure, while objects may have much in common with their immediate neighbors, objects on one extreme end of the cluster may have less in common with objects on another extreme end of the cluster. This can make it difficult to craft a signature that is broad enough to capture all points in the cluster, but narrow enough to avoid large numbers of false positives.

Clustering has many applications in many different branches of the data sciences. In this specification, detection of malware and other cybersecurity operations is used as an illustrative and nonlimiting example of the clustering method taught herein. However, the method is also applicable to other clustering applications, and those applications are not intended to be excluded from the present specification and the appended claims.

Sample clustering has multiple applications in cybersecurity and other industries. One common use case is clustering samples for the purpose of discovering a common pattern. This common pattern can then be used to achieve different objectives. One of these objectives in cybersecurity is to create signatures that can be used to detect all samples within a cluster. For example, a cluster can be include several variants of ransomware in a family, even though those variants are not identical and would not be detected by a single hash. With a good cluster, researches can identify common patterns among samples and author a signature that can capture the variants in the cluster, as well as similar variants that have not yet been encountered.

One issue with existing clustering systems is that they often form very large clusters of objects, containing a large variety of related samples. Yet samples on opposite edges of such a large cluster may be only tangentially related to one another, and it can be difficult to craft a signature that captures all those samples, while avoiding false positives. These large clusters may be considered "impure," in the sense that they contain an large group of only vaguely related samples. Existing algorithms can also require constant fine tuning of the parameters (such as how many clusters to derive), and may struggle to scale with big data. These factors create a challenging environment for security researchers trying to derive signatures from these clusters.

The present specification provides a system and method that will ordinarily yield smaller "micro-clusters," usually smaller than those that are found in existing clustering algorithms. These micro-clusters may maintain higher purity and precision, and may require significantly less parameter tuning. This provides an effective method for deriving signatures to proactively detect samples from the cluster and beyond.

The micro-clustering begins with an arbitrary vantage point called "Moon," which is expected to be far from all samples in the sample universe (e.g., just as every person on the earth is relatively far from the center of mass of the moon). Samples are sorted into a "sorted container," based on their distance from the Moon vantage. Samples are then compared only to their adjacent neighbors, and the samples cluster together so long as they do not exceed a distance threshold. Once an adjacent sample exceeds the distance threshold, the micro-cluster is closed out, and other samples in the set may or may not form more micro-clusters.

On a next pass, the Moon vantage is not used (because it would yield the same results). Instead a new vantage is selected, and a new sorted container is built, based on distance from the new vantage. In an illustrative case, the new vantage point is not a distant feature vector like Moon, but rather is selected from the set of samples that did not cluster on the first pass. In a specific example, the median remaining sample may be selected. Micro-clustering passes may continue in this manner, until a pass results in no new clusters, or until a threshold of MAX_PASSES. After all passes are complete, any samples that remain are considered unclustered samples.

While operating on sorted containers, the system may use a "laser cutting" strategy that obtains micro-clusters based on adjacent distance measurements, and cuts off a cluster once an adjacent sample is found above a distance threshold. Micro-clustered samples are then removed from the sorted container, and the process repeats with a new vantage point.

The system and method disclosed herein may realize advantages over existing clustering algorithms. For example, some algorithms have poor precision, such as K-Means. Because of this, authoring signatures from unstable clusters yields poor coverage, or may not even be possible where no pattern can be extrapolated from a group of vaguely related samples.

Other algorithms are more precise, but tend to form very large clusters. Creating a signature to capture all samples in such a cluster can yield a signature so broad that it also captures many false positives. The model can be fine-tuned to find "just right" sizes, but this is time consuming, highly data dependent, and may be undesirable for maintenance purposes.

Algorithms like DBSCAN may struggle to form reliable clusters when there is no obvious drop in density between clusters. In other words, if the input data have many clusters that may overlap (for example, malware data), DBSCAN may group multiple groups into a single cluster (thus, obtaining a single big blob cluster), which reduces the reliability of the solution for signature authoring.

Existing clustering algorithms may also be slow, and may face some scalability issues when dealing with big data. For example, a DBSCAN on over 3 million samples can require up to 128 GB of RAM to compute. This can be problematic in modern anti-malware systems that have collected malware samples over the course of decades, and where the number of samples may be in the billions.

Advantageously, the method disclosed herein is highly memory efficient, and may not require significant parameter tuning/maintenance. Furthermore, it yields micro-clusters are small enough to provide high precision and purity and reduce vague relationships. This enables better signature authoring.

The system and method of the present specification work well where the universe of samples can be represented by a Locality Sensitive Hashing (LSH) scheme that supports a distance metric between two arbitrary samples, in compliance with the triangle inequality. In other words, the LSH scheme should be able to measure the distance between any two samples, regardless of how distant they are. One example of a known LSH scheme that supports this is TLSH (the "T" has no specific meaning), but in general, any comparison algorithm that can calculate a distance between two samples is suitable. Within this specification, a value that can compare two samples, regardless of distance, is referred to as an "LSH-compliant" value.

The method disclosed can be iterated until the produced micro-clusters are satisfactory for the use case. The specific number of times to run the method may depend on the input data. It may be beneficial to define a MAX_PASSES limit, to help the system finish clustering within the desired time. For example, setting MAX_PASSES to 15 would run a maximum of 15 passes, and then stop clustering (possibly leaving some unclustered samples behind). Empirical evaluation has found that for many data sets, after 6 passes, the return of investment diminishes significantly. Thus, even though additional passes will still yield extra micro-clusters, these may be less relevant than the ones obtained during the initial passes.

In an illustrative example, an initial vantage point is selected. A vantage point is defined as any arbitrary (real or virtual) LSH-compliant value that may be used as a reference to measure the distance of the universe samples against. For example, a vantage point may be selected with the intent that it is not expected to be very close to any real samples. This may include, for example, creating a fake feature vector with all characters being the same character, such as hexadecimal 'F,' the last hexadecimal character. Any other value could be used, such as '7' (the median hexadecimal character), or '0' or '1' (low characters). The hash could also be generated randomly, or based on an alternating pattern (e.g., "017F017F . . . "). Any of these are statistically unlikely to be close to actual samples. Thus, example "Moon" vantage hashes may include:

"FFFFFFFFFFFFFFFFFFFFFFFFFFFFFFFFFF FFFFFFFFFFFFFFFFFFFFFFFFFFFFFF FFFFFFF"

"7777777777777777777777777777777777 777777777777777777777777777 7777777"

Or any other selected value.

Using the defined vantage point, the system creates a sorted container, including the full universe of samples. A sorted container may be a simple data structure like a list or a dictionary, which is natively sorted using a distance/comparison criterion. In this case, the system uses the LSH-compliant value distance, measured between each sample and the vantage point. Thus, when this sorted container is created, samples closer to the vantage point are at the beginning of the container, while samples distant from the vantage point will be placed towards the end of the container.

Figure 4:
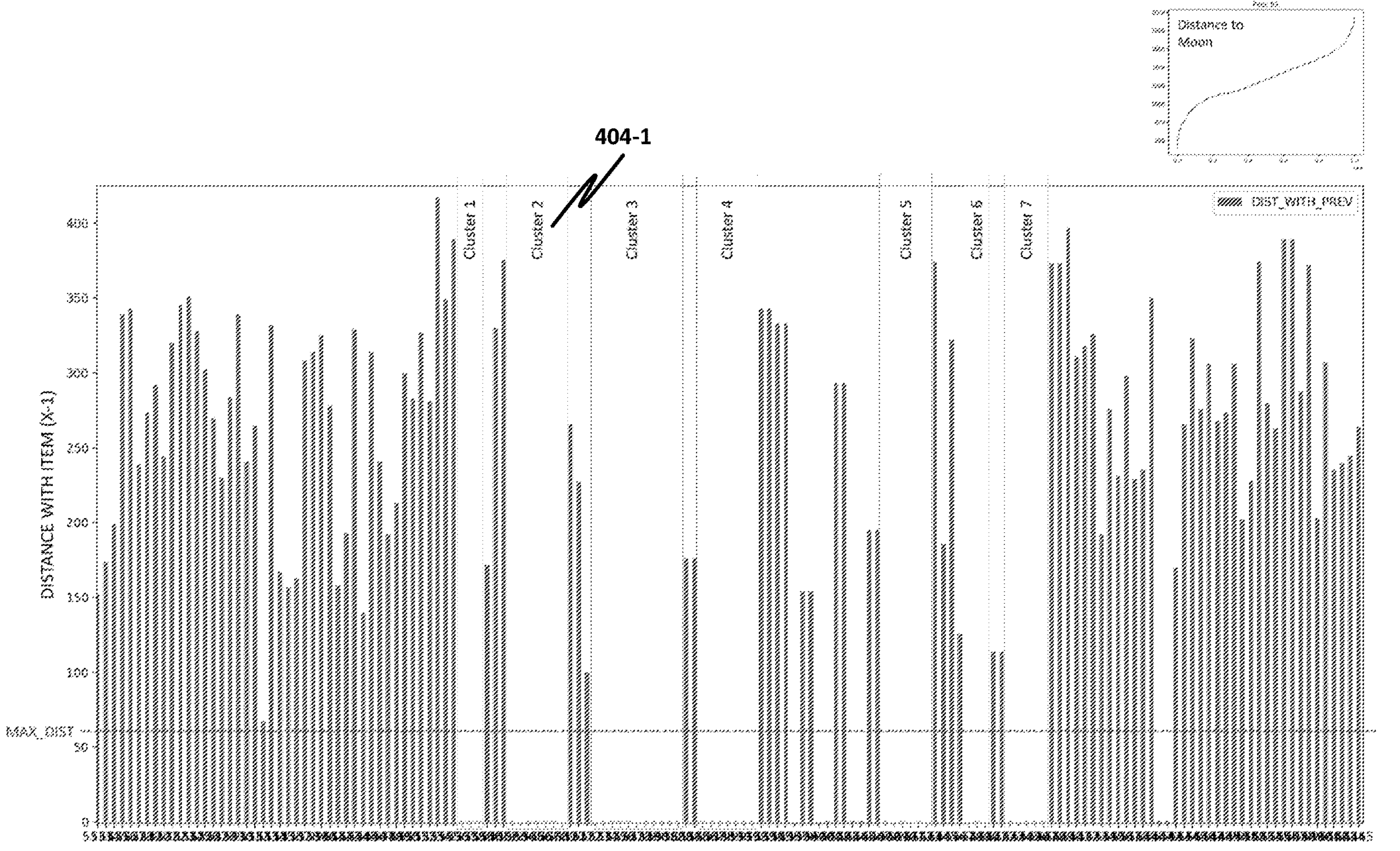
FIG. 4 is a distance plot illustrating selected aspects of clustering.

The system then iterates through the sorted container, computing the distance between the current sample (N) and the previous sample (N−1). If this distance does not exceed the MAX_DIST (which can be derived empirically depending on the input data), then include the sample N into a temporary micro-cluster. If this is a new micro-cluster, the system also adds sample (N) to the micro-cluster, as there is no previous sample. Subsequently, the system only adds sample (N) if its distance with (N−1) is satisfactory. This identifies "distance valleys," which are used to form micro-clusters. This effect is depicted in FIG. 4.

While iterating through a sorted container, if the distance between (N) and (N−1) exceeds MAX_DIST, then the temporary micro-cluster is closed. If the temporary micro-cluster has more than MIN_SAMPLES (which can be defined by the user), then the formed micro-cluster is saved and all the samples belonging to it are marked for removal from the sorted container. If the temporary micro-cluster does not have enough samples, then the temporary micro-cluster is discarded and reset. The iteration of the sorted container continues until the end of the container.

Once the sorted container has been fully iterated, samples marked for removal (e.g., because they were sorted into micro-clusters) are removed from the sorted container.

After removing clustered samples from the sorted container, the system identifies a new sample to use as the vantage point for the next pass. This may be, for example, the sample in the "middle" or median of the remaining samples in the sorted container. This may be obtained, for example, by dividing the length of the remaining container by 2, and selecting the sample at that index as the new vantage point.

The system then iterates again, sorting the remaining samples based on their LSH-compliant distance from the new vantage point, and then clustering is repeated.

Once the system has executed MAX_PASSES, or an execution pass is unable to form any new micro-clusters, the formed micro-clusters are collected as the output of the method, and the method terminates.

In this manner, the resulting micro-clusters are "opportunistically" discovered and formed. This is a consequence of sorting the universe against a vantage point. This sorting ensures that very similar samples are near one another, and can be discovered by the laser cutting algorithm that forms micro-clusters.

One rationale behind micro-clustering is that the samples within a micro-cluster are similar enough for discovering patterns (e.g., strings or functionality that the samples have in common) so that a signature can be authored with confidence. A larger and less dense cluster may introduce the risk of not being able to find good commonality between the samples of the cluster.

Targeted Clustering

The present specification also illustrates a system and method for targeted clustering. The targeted clustering method uses many of the same concepts as the micro-clustering method. An illustrative use case of targeted clustering is determining whether or not an incoming sample should be detonated. Sample detonation includes allowing the sample to run in a constrained ("sandboxed") environment so that its behavior can be closely monitored. Sample detonation computationally expensive, and many malware samples attempt to determine if they are running in a sandbox, and alter their behavior to avoid detection. Thus, it may be advantageous to appropriately cluster a sample without detonation. If an incoming sample is closely clustered with a group of known malware, with strong similarity, then the system may skip detonation with high confidence that the sample is malware or a "potentially unwanted program" (PUP). This may provide at least a preliminary classification and early detection of potentially malicious programs while preserving compute resources.

However, some existing clustering methods may be ill-suited for real-time or near real-time detection of new malware samples. For example, K-Means may lack precision in its clustering, while a large-scale algorithm such as DBSCAN may scale poorly to a sample space of millions or billions of samples, such as the sample spaces of security services vendors. Using DBSCAN for example, it can take several hours to cluster a sample because the individual sample is not clustered by itself, but rather the entire universe of samples must be re-clustered. This large scale re-clustering is also resource intensive, which translates to elevated operational costs for the organization.

The present specification provides an improved clustering calculation that uses bucketized sorted containers to align the universe of samples against a set of vantage points to obtain a pre-sorted universe. In this example, multiple vantage points may be used. Notably, multiple vantage points could also be used in the micro-clustering method illustrated previously. The use of multiple vantage points can increase accuracy, particularly for large data sets.

In an illustrative example, the universe of samples is compared to a plurality of vantage points, such as three vantage points here called "Moon," "Sun," and "Mars." Thus, the universe of samples may yield three sorted containers, one for each vantage point. The sorted containers may then be bucketized across the range of distances. For example, in a universe of samples where the maximum distance from a given vantage point is 1200, samples may be sorted into buckets of distance, such as less than or equal to 200, 200 400, 400 to 900, and 900 to 1200.

When a new sample is encountered, the distance from the sample to the vantage points can be measured, and the new sample can be assigned to an appropriate bucket for each vantage point. In one illustrative use case, the assigned per-vantage buckets are used for further analysis of the sample. Furthermore, to capture edge conditions, adjacent buckets may also be captured. For example, if the bucket that the sample belongs to is bucket N, then buckets N−1 and N+1 may also be captured. Thus, in a use case with three vantage points, three buckets are captured for each vantage point, for a total of nine buckets. The buckets from each vantage point are consolidated into a single meta-bucket. An intersection sample set may then be computed, comprising only samples that appear in all three meta-buckets. This intersection data set may then be sorted into a sorted container, using the new unknown sample as a vantage point. A laser cutting method, similar to the one used in the micro-clustering algorithm, may be applied to cut off this sample space at the first sample greater than a threshold MAX_DIST from the new unknown sample. This provides a reduced target bucket, which can then be used to characterize the new sample. For example, if the target bucket includes exclusively malware samples, or mostly malware samples, then the new sample may also be treated as malware, at least as a preliminary classification until more detailed analysis is performed.

This method provides advantages over more complex algorithms like DBSCAN and K-Means, which may not scale well when dealing with millions or billions of samples. This method may also provide advantages where existing clustering algorithms lack precision. Existing algorithms may perform provide some trade-offs between precision and speed. For example, K-Means is optimized for speed at the expense of precision. On the other hand, DBSCAN is optimized for precision at the expense of scalability. Furthermore, while some binary tree implementations are precise, these often operate in the domain of probabilistic data structures, so that not all neighbors may be found through the traversal of the trees.

The present method may also provide advantages over algorithms that are difficult to fine tune. Existing clustering algorithms may require the configuration of several parameters that are defined via trial and error. These parameters may change when underlying data change. Thus, a specified number of clusters or a maximum distance or number of samples per cluster may be highly data dependent. These parameters may require maintenance when the universe of samples changes. And in the particular case of malware detection, the universe of samples changes very often.

The present specification may also provide enhanced maintainability over clustering algorithms that assume a static universe of the sample space. When the universe changes, some existing clustering algorithms require re-computation of the entire data set. This is computationally expensive and inefficient. For the particular use case of real-time queries about unknown samples, such algorithms may have difficulty updating the universe of samples on demand without re-computing the clusters.

The present specification may provide scalability that in some cases performs as well as a brute force approach, without requiring as much fine tuning. While it may be desirable to specify a number of buckets, even this parameter may be automatically discovered in software. Underlying structure can be updated (such as adding or removing elements) on the fly without requiring a full re-clustering operation.

The clustering method described here clusters a specific sample within a universe of samples. This clustering method may be referred to as "targeted clustering." As compared to some existing clustering algorithms, this method does not need to pass over the entire universe of samples to answer the question "Which clustered does this new sample belong to?" Rather, the present method uses targeted clustering, which may require only a limited clustering operation to determine which cluster the sample belongs to. This may provide much faster clustering than existing clustering algorithms, which makes the method scalable and applicable to real-time use cases-such as when a user submits a sample to determine if the sample is safe and can operate safely on the user's machine.

The targeted clustering method disclosed herein may be divided into two stages. The first stage includes data preparation and processing, which happens initially on the full universe of samples. This operation may be needed only once, or at least infrequently. The operation may be updated periodically as data become stale. However, the first stage need not be repeated for every sample submitted.

The second stage provides the targeting targeted clustering, wherein a single cluster is formed to contain a specific target or sample of interest. This can be repeated for each new sample, and advantageously is much less computationally intensive than a full clustering passed on the entire data set.

As with the micro-clustering method, targeted clustering works well on samples that can be represented by an LSH scheme that supports a distance metric between arbitrary samples in compliance with the triangle inequality. As with the micro-clustering, TLSH is one suitable cluster or one suitable caching mechanism.

In the figures below, FIGS. 6*a* through 8 illustrate a first stage of the targeted clustering method. FIGS. 9 through 12 represent a second stage of the targeted clustering method. For better understanding, these figures may be read in context of the micro-clustering description illustrated in FIGS. 3*a* through 5.

Selected Examples

The foregoing can be used to build or embody several example implementations, according to the teachings of the present specification. Some example implementations are included here as nonlimiting illustrations of these teachings.

There is disclosed in an example, a computer-implemented method of classifying a target sample, wherein the target sample is a computer object having a feature vector, the method comprising: creating n sorted containers, comprising sorting a universe of samples based on feature vector distances from the samples to n vantage points, wherein n is a positive integer; storing the n sorted containers to a computer memory; bucketizing the n sorted containers; for the n vantage points, selecting, from the n bucketized sorted containers, n meta-buckets of that the target sample belongs to; creating an intersection container, comprising samples that appear in all n meta-buckets; selecting, as a target cluster, samples from the intersection container that have a feature vector distance from the target sample less than a threshold; and acting on the target cluster.

There is further disclosed an example, wherein n=1.

There is further disclosed an example, wherein n>1.

There is further disclosed an example, wherein n=3.

There is further disclosed an example, wherein the feature vector distances are locality sensitive hashing (LSH) compliant distances.

There is further disclosed an example, wherein the LSH compliant distances are TLSH distances.

There is further disclosed an example, wherein the n meta buckets comprise buckets that have a range that includes distances from the target sample to the n vantage points.

There is further disclosed an example, wherein the n meta buckets comprise buckets that have a range that includes distances from the target sample to the n vantage points, plus adjacent buckets.

There is further disclosed an example, wherein the n meta buckets comprise buckets that have a range that includes distances from the target sample to the n vantage points, plus a nearest adjacent bucket.

There is further disclosed an example, wherein selecting the n meta-buckets comprises consolidating buckets that the target sample belongs to with respective adjacent buckets.

There is further disclosed an example, wherein selecting samples from the intersection container comprises sorting the intersection container based on distance from the target sample, iterating through samples until a terminal sample is reached that has a feature vector distance greater than the threshold, and discarding the terminal sample from the target cluster.

There is further disclosed an example, wherein sorting the intersection container based on distance from the target sample comprises computing locality-sensitive hashing (LSH) compliant distances between the samples of the intersection container and the target sample.

There is further disclosed an example, wherein acting on the target cluster comprises assigning to the target sample a common label of samples in the target cluster.

There is further disclosed an example, wherein acting on the target cluster comprises assigning to the target sample a majority label of samples in the target cluster.

There is further disclosed an example of an apparatus comprising means for performing the method.

There is further disclosed an example, wherein the means for performing the method comprise a processor and a memory.

There is further disclosed an example, wherein the memory comprises machine-readable instructions that, when executed, cause the apparatus to perform the method.

There is further disclosed an example, wherein the apparatus is a computing system.

There is further disclosed an example of at least one computer readable medium comprising instructions that, when executed, implement a method or realize an apparatus as described.

There is further disclosed an example of one or more tangible, nontransitory computer-readable storage media having stored thereon executable instructions to classify a target sample, wherein the target sample is a computer object having a feature vector, the instructions to: create n sorted containers, comprising sorting a universe of samples based on feature vector distances from the samples to n vantage points, wherein n is a positive integer; bucketize the n sorted containers; for the n vantage points, select, from the n bucketized sorted containers, n meta-buckets of that the target sample belongs to; create an intersection container, comprising samples that appear in all n meta-buckets; select, as a target cluster, samples from the intersection container that have a feature vector distance from the target sample less than a threshold; and act on the target cluster.

There is further disclosed an example, wherein n=1.

There is further disclosed an example, wherein n>1.

There is further disclosed an example, wherein n=3.

There is further disclosed an example, wherein the feature vector distances are locality sensitive hashing (LSH) compliant distances.

There is further disclosed an example, wherein the LSH compliant distances are TLSH distances.

There is further disclosed an example, wherein the n meta buckets comprise buckets that have a range that includes distances from the target sample to the n vantage points.

There is further disclosed an example, wherein the n meta buckets comprise buckets that have a range that includes distances from the target sample to the n vantage points, plus adjacent buckets.

There is further disclosed an example, wherein the n meta buckets comprise buckets that have a range that includes distances from the target sample to the n vantage points, plus a nearest adjacent bucket.

There is further disclosed an example, wherein selecting the n meta-buckets comprises consolidating buckets that the target sample belongs to with respective adjacent buckets.

There is further disclosed an example, wherein selecting samples from the intersection container comprises sorting the intersection container based on distance from the target sample, iterating through samples until a terminal sample is reached that has a feature vector distance greater than the threshold, and discarding the terminal sample from the target cluster.

There is further disclosed an example, wherein sorting the intersection container based on distance from the target sample comprises computing locality-sensitive hashing (LSH) compliant distances between the samples of the intersection container and the target sample.

There is further disclosed an example, wherein acting on the target cluster comprises assigning to the target sample a common label of samples in the target cluster.

There is further disclosed an example, wherein acting on the target cluster comprises assigning to the target sample a majority label of samples in the target cluster.

There is further disclosed an example of a computing apparatus, comprising: one or more hardware platforms, comprising one or more processor circuits and one or more memories; and instructions encoded within the one or more memories to instruct the one or more processor circuits to: create n sorted containers, comprising sorting a universe of samples based on feature vector distances from the samples to n vantage points, wherein n is a positive integer; bucketize the n sorted containers; for the n vantage points, select, from the n bucketized sorted containers, n meta-buckets that a target sample belongs to; create an intersection container, comprising samples that appear in all n meta-buckets; select, as a target cluster, samples from the intersection container that have a feature vector distance from the target sample less than a threshold; and act on the target cluster.

There is further disclosed an example, wherein n=1.

There is further disclosed an example, wherein n>1.

There is further disclosed an example, wherein n=3.

There is further disclosed an example, wherein the feature vector distances are locality sensitive hashing (LSH) compliant distances.

There is further disclosed an example, wherein the LSH compliant distances are TLSH distances.

There is further disclosed an example, wherein the n meta buckets comprise buckets that have a range that includes distances from the target sample to the n vantage points.

There is further disclosed an example, wherein the n meta buckets comprise buckets that have a range that includes distances from the target sample to the n vantage points, plus adjacent buckets.

There is further disclosed an example, wherein the n meta buckets comprise buckets that have a range that includes distances from the target sample to the n vantage points, plus a nearest adjacent bucket.

There is further disclosed an example, wherein selecting the n meta-buckets comprises consolidating buckets that the target sample belongs to with respective adjacent buckets.

There is further disclosed an example, wherein selecting samples from the intersection container comprises sorting the intersection container based on distance from the target sample, iterating through samples until a terminal sample is reached that has a feature vector distance greater than the threshold, and discarding the terminal sample from the target cluster.

There is further disclosed an example, wherein sorting the intersection container based on distance from the target sample comprises computing locality-sensitive hashing (LSH) compliant distances between the samples of the intersection container and the target sample.

There is further disclosed an example, wherein acting on the target cluster comprises assigning to the target sample a common label of samples in the target cluster.

There is further disclosed an example, wherein acting on the target cluster comprises assigning to the target sample a majority label of samples in the target cluster.

There is further disclosed an example, further comprising a virtualization infrastructure.

There is further disclosed an example, further comprising a containerization infrastructure.

DETAILED DESCRIPTION OF THE DRAWINGS

A system and method for micro-clustering will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a block diagram of a security ecosystem 100. In the example of FIG. 1, security ecosystem 100 may be an enterprise, a small business, a charity, a government entity, a data center, a telecommunications provider, a "smart home" with computers, smart phones, and various internet of things (IoT) devices, or any other suitable ecosystem. Security ecosystem 100 is provided herein as an illustrative and nonlimiting example of a system that may employ, and benefit from, the teachings of the present specification.

Because one concern with security ecosystem 100 is to identify malware objects, the system may benefit from strong signature matching, which may be facilitated by the micro-clustering method of the present specification.

Security ecosystem 100 may include one or more protected enterprises 102. A single protected enterprise 102 is illustrated here for simplicity, and could be a business enterprise, a government entity, a family, a nonprofit organization, a church, or any other organization that may subscribe to security services provided, for example, by security services provider 190.

Within security ecosystem 100, one or more users 120 operate one or more client devices 110. A single user 120 and single client device 110 are illustrated here for simplicity, but a home or enterprise may have multiple users, each of which may have multiple devices, such as desktop computers, laptop computers, smart phones, tablets, hybrids, or similar.

Client devices 110 may be communicatively coupled to one another and to other network resources via local network 170. Local network 170 may be any suitable network or combination of one or more networks operating on one or more suitable networking protocols, including a local area network, a home network, an intranet, a virtual network, a wide area network, a wireless network, a cellular network, or the internet (optionally accessed via a proxy, virtual machine, or other similar security mechanism) by way of nonlimiting example. Local network 170 may also include one or more servers, firewalls, routers, switches, security appliances, antivirus servers, or other network devices, which may be single-purpose appliances, virtual machines, containers, or functions. Some functions may be provided on client devices 110.

In this illustration, local network 170 is shown as a single network for simplicity, but in some embodiments, local network 170 may include any number of networks, such as one or more intranets connected to the internet. Local network 170 may also provide access to an external network, such as the internet, via external network 172. External network 172 may similarly be any suitable type of network.

Local network 170 may connect to the internet via gateway 108, which may be responsible, among other things, for providing a logical boundary between local network 170 and external network 172. Local network 170 may also provide services such as dynamic host configuration protocol (DHCP), gateway services, router services, and switching services, and may act as a security portal across local boundary 104.

In some embodiments, gateway 108 could be a simple home router, or could be a sophisticated enterprise infrastructure including routers, gateways, firewalls, security services, deep packet inspection, web servers, or other services.

In further embodiments, gateway 108 may be a standalone internet appliance. Such embodiments are popular in cases in which ecosystem 100 includes a home or small business. In other cases, gateway 108 may run as a virtual machine or in another virtualized manner. In larger enterprises that features service function chaining (SFC) or NFV, gateway 108 may be include one or more service functions and/or virtualized network functions.

Local network 170 may also include a number of discrete IoT devices. For example, local network 170 may include IoT functionality to control lighting 132, thermostats or other environmental controls 134, a security system 136, and any number of other devices 140. Other devices 140 may include, as illustrative and nonlimiting examples, network attached storage (NAS), computers, printers, smart televisions, smart refrigerators, smart vacuum cleaners and other appliances, and network connected vehicles.

Local network 170 may communicate across local boundary 104 with external network 172. Local boundary 104 may represent a physical, logical, or other boundary. External network 172 may include, for example, websites, servers, network protocols, and other network-based services. In one example, an attacker 180 (or other similar malicious or negligent actor) also connects to external network 172. A security services provider 190 may provide services to local network 170, such as security software, security updates, network appliances, or similar. For example, MCAFEE, LLC provides a comprehensive suite of security services that may be used to protect local network 170 and the various devices connected to it.

It may be a goal of users 120 to successfully operate devices on local network 170 without interference from attacker 180. In one example, attacker 180 is a malware author whose goal or purpose is to cause malicious harm or mischief, for example, by injecting malicious object 182 into client device 110. Once malicious object 182 gains access to client device 110, it may try to perform work such as social engineering of user 120, a hardware-based attack on client device 110, modifying storage 150 (or volatile memory), modifying client application 112 (which may be running in memory), or gaining access to local resources. Furthermore, attacks may be directed at IoT objects. IoT objects can introduce new security challenges, as they may be highly heterogeneous, and in some cases may be designed with minimal or no security considerations. To the extent that these devices have security, it may be added on as an afterthought. Thus, IoT devices may in some cases represent new attack vectors for attacker 180 to leverage against local network 170.

Malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110 or any of the IoT devices described. As used throughout this specification, malicious software ("malware") includes any object configured to provide unwanted results or do unwanted work. In many cases, malware objects will be executable objects, including, by way of nonlimiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including, by way of nonlimiting example, data destruction, data denial, covert data collection, browser hijacking, network proxy or redirection, covert tracking, data logging, keylogging, excessive or deliberate barriers to removal, contact harvesting, and unauthorized self-propagation. In some cases, malware could also include negligently-developed software that causes such results even without specific intent.

In enterprise contexts, attacker 180 may also want to commit industrial or other espionage, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to an application repository or programming an IoT device may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Protected enterprise 102 may contract with or subscribe to a security services provider 190, which may provide security services, updates, antivirus definitions, patches, products, and services. MCAFEE, LLC is a nonlimiting example of such a security services provider that offers comprehensive security and antivirus solutions. In some cases, security services provider 190 may include a threat intelligence capability such as the global threat intelligence (GTI™) database provided by MCAFEE, LLC, or similar competing products. Security services provider 190 may update its threat intelligence database by analyzing new candidate malicious objects as they appear on client networks and characterizing them as malicious or benign.

Other security considerations within security ecosystem 100 may include parents' or employers' desire to protect children or employees from undesirable content, such as pornography, adware, spyware, age-inappropriate content, advocacy for certain political, religious, or social movements, or forums for discussing illegal or dangerous activities, by way of nonlimiting example.

Figure 2:
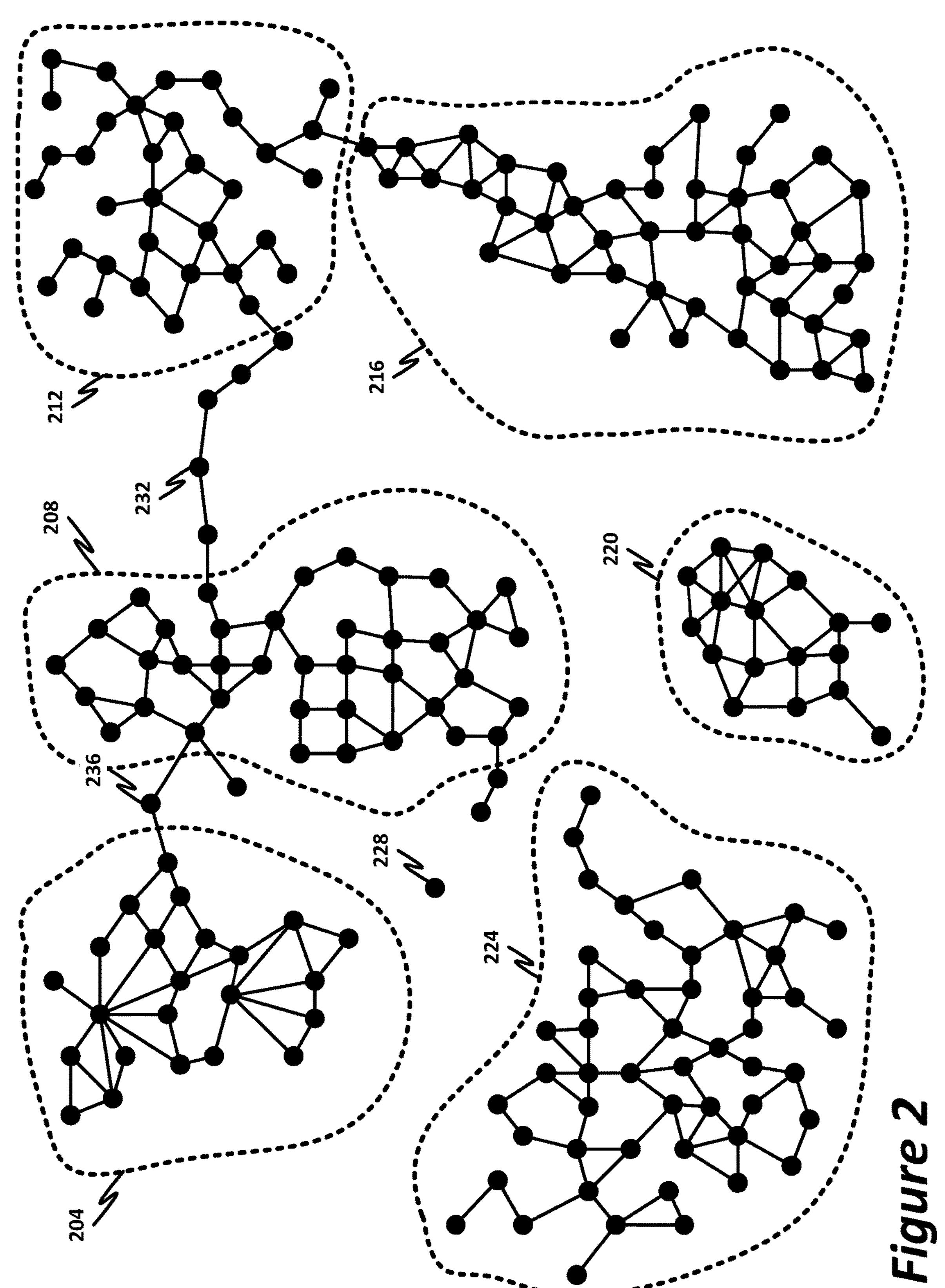
FIG. 2 is a block diagram illustration of selected elements of a clustering system.

FIG. 2 is a block diagram illustration of selected elements of a clustering system. Clustering is useful in estimating the properties of an object, on the assumption that if objects cluster together based on certain properties, other properties are also likely to be similar. For example, clustering may be used as to assign an estimated security classification to an object, such as "green," "yellow," or "red," where green indicates that the object is safe, yellow indicates that the object is suspicious or has unknown provenance, and red indicates that the object is malicious. Other classification schemes may also be used, including multi-factor classification schemes. Security services vendors may have databases of millions or billions of known objects with known security classifications.

The present specification teaches a novel clustering algorithm. Illustrative examples of known clustering algorithms include, without limitation, DBSCAN, K-means, Binary Tree, Fuzzy Clustering, Affinity Propagation, Normal Distribution, Mean Shift, Hierarchical Clustering, Spectral Clustering, and Mean Clustering.

When a system or an enterprise encounters a new, unknown object, the object may be featurized and mapped into a cluster space. If the object clusters strongly with other objects with known reputations, then at least as an initial classification, the system may assume that the object has the same classification as other objects in the cluster. For example, if all objects are known safe, the new object may be treated as safe. If all are known malicious, the object may be treated as malicious. If there are different classifications within the cluster, then the classification for a majority or supermajority of the known objects may be used for the new object.

In the example of FIG. 2, a group of objects (represented here as individual points) have been mapped into an object space. The objects are clustered according to their proximity to one another.

In one illustrative example, mapping the objects may include extracting features from the object into a feature vector. DBSCAN is used here as an illustration of the principles of clustering. Other clustering algorithms may use different algorithms, although the concept of similarity based on proximity may, at some level, be preserved.

Nonlimiting and illustrative examples of features that may be used in a feature vector include:

a. File name
b. File type or extension
c. File size
d. File lines (number of rows in the byte view of the file)
e. String Length (number of corresponding length of strings in the file)
f. 1-gram (number of characters in the file)
g. File entropy
h. ASM (assembly) Registers (the number of registry keys accessed or modified by the file)
i. ASM Opcode (the number of opcodes recognized)
j. ASM DD (the number of instructions occurrences of the pseudo instruction "dd")
k. ASM DW (the number of occurrences of the pseudo instruction "dw")
l. ASM symbols (the number of special symbols)
m. PE (portable executable) API (the number of suspicious API classes)
n. PE DLL (the number of dynamic link libraries accessed by the file)
o. PE imports (the number of imports)
p. PE exports (the number of exports)
q. PE mastiff (information from a Mastiff report)
r. PE Alert API (that static number of malicious APIs)
s. PE Compile (the compiler environment of the sample)
t. Hexadecimal byte code features
u. Visible strings, or a statistical representation of strings
v. Assembler code features
w. Anti-detection features The foregoing list is illustrative only and non-exhaustive.

For a particular embodiment, the system designer selects a number of n features for the system, and extracts those n features from each sample. In this case, n may be any integer where n≥1, although as the number of features increases, so does the complexity of the system. Thus, a system designer may trade off between feature granularity and system performance, depending on the needs of an embodiment and the available compute resources.

In an illustrative clustering algorithm, each sample is mapped into an n-dimensional space, and the system computes scalar distance between each point and one or more nearest neighbors. The designer may select a distance ε, and any objects within distance ε of one another cluster together.

In this example, the samples have clustered into a plurality of clusters, namely cluster 204, cluster 208, cluster 212, cluster 216, cluster 220, and cluster 224. A small number of points are illustrated here to simplify the illustration, although in a real-world use case, the number of points may be in the hundreds, thousands, millions, or billions. The clusters and distances are not necessarily shown to scale, each point may represent some greater number of points, and each connection/proximity line may represent one or more proximity connections (e.g., each proximity line represents a connection to a point within distance ε).

One issue with large clusters is that it can be difficult to craft a meaningful signature of features that is broad enough to capture all points in the cluster, and narrow enough to be meaningful. Thus, one advantage of the present specification is that the system and method disclosed can form micro-clusters, which are generally expected to be smaller and more focused than the large clusters from an algorithm such as DBSCAN.

The clusters illustrated here may include a number of "core points," which are points proximate to at least minPTS points. For example, if minPTS=4, then a sample must be proximate to at least three other points (counting itself as the fourth proximate point) to be considered a core point. Core points are important to DBSCAN and some other clustering methods because core points consistently map to the same cluster across different runs, even if the data are in a different order. A noncore point 236 is also illustrated. This point is within distance ε of at least one other point, but not enough points to be considered a core point. Thus, depending on the ordering of the data, the point may cluster with either 204 or 208. Noncore point 236 appears as a "bridge" between clusters 204 and 208.

Clusters 212 and 216 may be two separate clusters, or one single cluster, depending on the designer's selection of minPts. A chain of points with few connections forms a bridge between the two clusters. This illustrates the principle that the selection of minPTS may influence the number of clusters that form. A higher value for minPTS may form smaller clusters with greater similarity. A smaller value may form larger clusters with rougher similarity. The selection will depend on the needs of a particular embodiment.

Clusters 208 and 212 are joined by a bridge 232 of noncore points. This bridge illustrates that some points may share some similarity, but as the cluster drifts, the overall similarity of the cluster may decrease, and at some point its predictive value may be compromised. Indeed, clusters 204, 208, 212, and 216 could form one large supercluster if minPTS is selected to be sufficiently small. Whether this supercluster would be sufficiently predictive of the properties of members of the cluster may depend on the specific use case.

In contrast, clusters 220 and 224 have no bridge to any other clusters, so those clusters may remain the same, regardless of the value of minPTS. However, the addition of new data to the dataset may influence later runs of the algorithm and may form bridges.

One advantage of the present clustering method is that, in at least some examples, it is unnecessary to differentiate core points from noncore points. Because micro-clustering does not rely on such definitions, all points in a cluster can be considered as effectively equal.

Also illustrated here in an outlier point 228. Outlier 228 is not similar enough to any other sample to cluster, regardless of the value of minPTS. Thus, clusters are not predictive of the properties of outlier 228.

In an illustrative use case, a security services vendor receives new samples that have been found in the wild, such as a batch of new PEs. These PEs have not yet been characterized, and so they have not yet been assigned reputations. Detailed static analysis, dynamic analysis, and/or sandbox analysis may yield a high-confidence prediction of whether the new objects are safe (green), suspicious (yellow), or malicious (red). However, performing analysis of all the new objects takes time and compute resources, sometimes significantly (e.g., the analysis may take hours or days, depending on the nature of the samples and the number of samples). To provide a medium-confidence intermediate reputation for the new objects, the security services vendor may cluster them in an object space as illustrated. If a plurality, majority, supermajority, or other proportion of samples in the clusters have a common reputation, then the new samples may be assigned that reputation, at least preliminarily (or permanently, as required). If a particular cluster does not have a satisfactory proportion of reputations (e.g., if the results are too mixed to be useful), then as an alternative, the sample may get its reputation from a selected number of nearest neighbors.

FIGS. 3*a*-3*f* are a block diagram illustration of selected elements of a micro-clustering method.

Figure 3A:
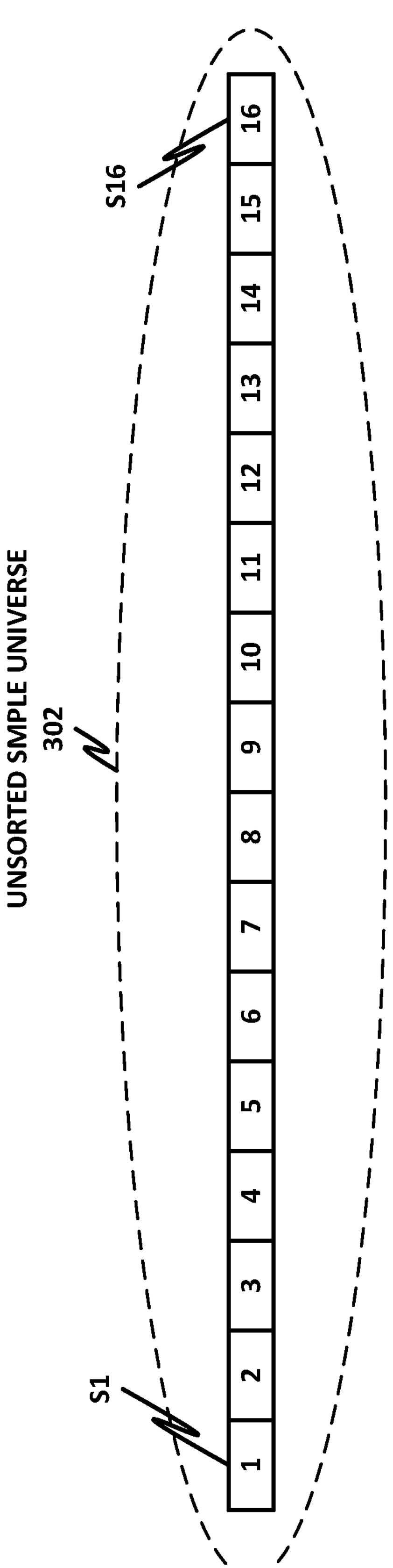
FIGS. 3*a*-3*f* are a block diagram illustration of selected elements of a clustering method.

Starting in FIG. 3*a*, there is illustrated an unsorted sample universe 302. For simplicity of the illustration, 16 samples are shown here, named samples S1 through S16. In real-world applications, the number of samples may be much higher. Furthermore, the number of samples or objects within a micro-cluster may be higher than is illustrated here.

In FIG. 3*a*, the 16 samples are simply enumerated, and are in no particular order.

Figure 3B:
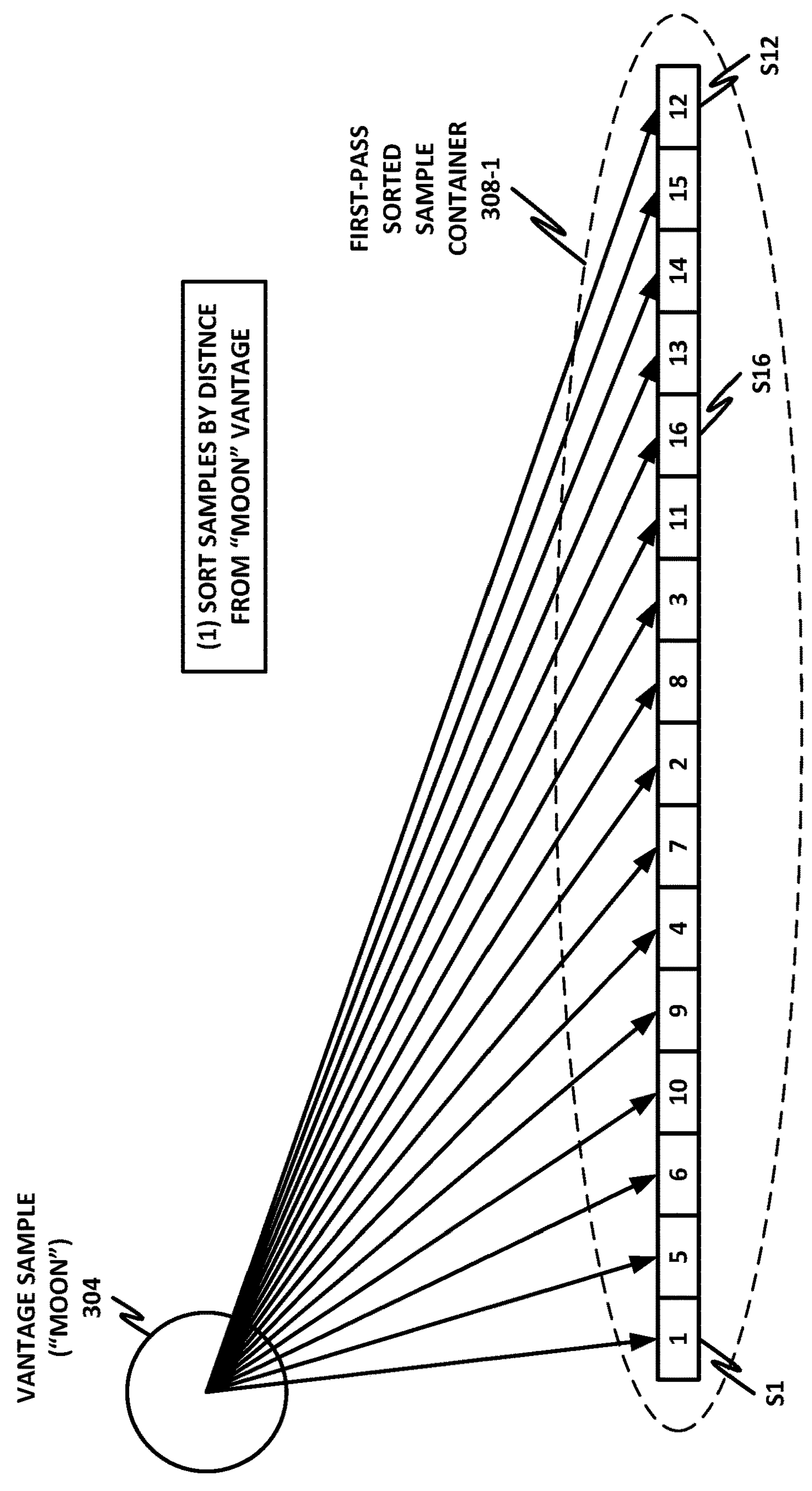

Turning to FIG. 3*b*, the system selects a vantage sample 304, referred to here as the "Moon" vantage point. The name Moon here is provided to illustrate that it may be desirable that the moon sample is not itself close to any of the samples in the sample universe. By analogy, if all humans on the face of the earth were to be considered samples in such a sorting algorithm, then the system may compute the distance from the center of mass of the moon to each person. As there have been no humans on the moon for several decades, each person enumerated is expected to be far from the moon.

To provide this Moon vantage, a fictional or arbitrary feature vector may be constructed, with the expectation that the feature vector for the Moon vantage will not be similar to any of the samples in the sample universe. In one illustrative example, the feature vector hash for the Moon vantage sample is selected as a string of identical characters, such as hexadecimal F, (the last hexadecimal digit), hexadecimal 7 (the median hexadecimal digit), or hexadecimal 0 or 1 (low hexadecimal digits). In practice, it is extraordinarily unlikely for any feature vector hash to be a string of identical digits. Other methods of selecting a Moon vantage are also available, such as using an alternating series of digits, or generating a feature vector hash using a random or pseudorandom number generator. If the feature vector hash is sufficiently large, then even selecting a random hash is likely to yield a feature vector that is not close to any of the samples in unsorted sample universe 302.

To begin the method, the system may compute the distance from vantage sample 304 to each individual sample. This yields a scalar value that can be easily compared. The samples may then be sorted according to their distance to the Moon vantage sample 304, forming first pass sorted container 308-1. For example, sample S1 is the closest sample to vantage sample 304, while sample S 12 is the furthest from vantage sample 304. The other samples are ordered according to their distance from the moon vantage sample 304.

Figure 3C:
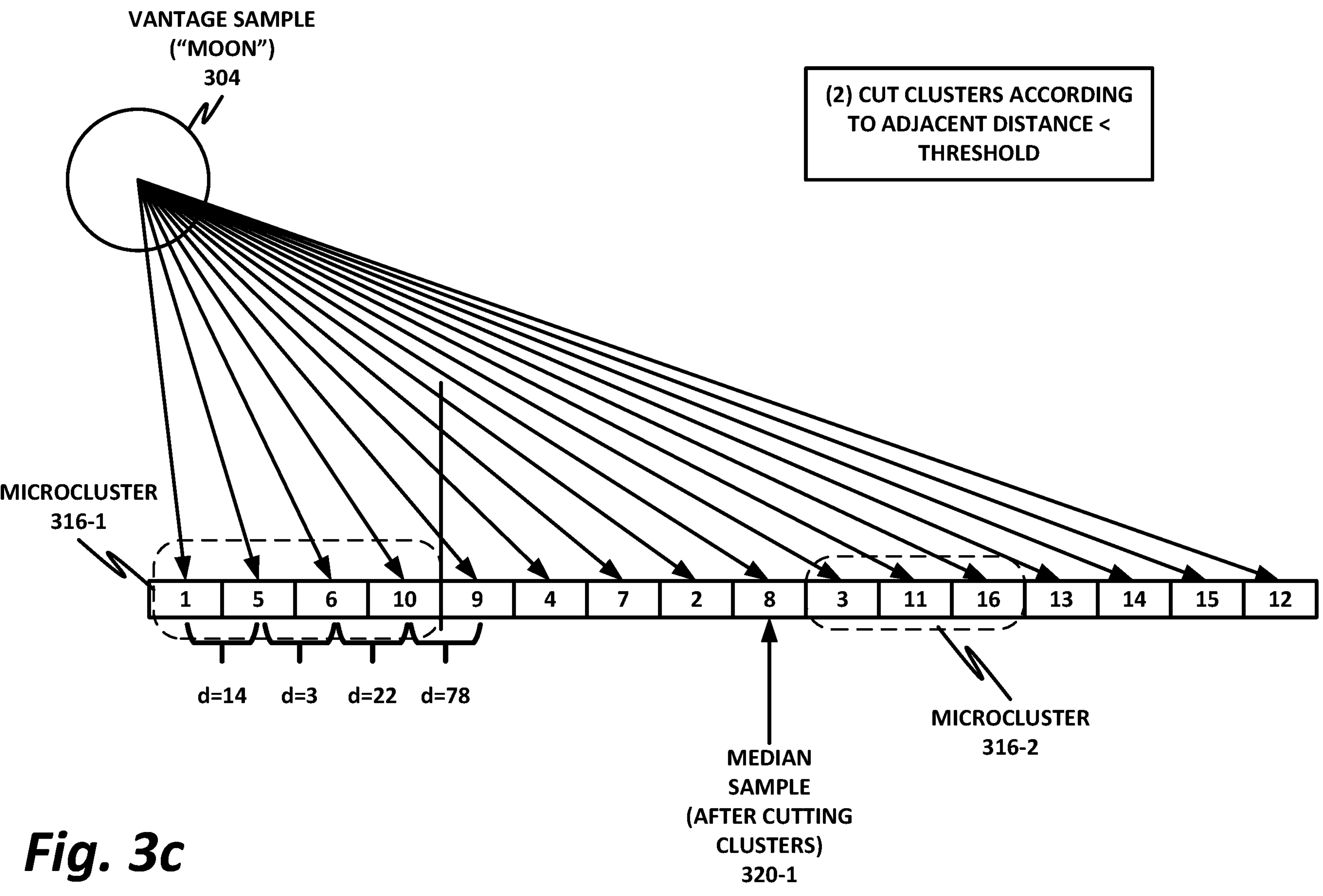

Turning to FIG. 3*c*, once the samples are ordered, a routine known as "laser cutting" may be used to form micro-clusters. In this operation, the system computes a distance between each object in the sorted sample container and its next adjacent neighbor. For example, the system computes the distance between sample five and sample one, the distance between sample six and sample five, the distance between sample ten and sample six, and so on. A threshold or maximum distance may be defined, which indicates how close two samples must be to be assigned to the same cluster. Using a hashing function such as MinHash or some other LSH, such as TLSH, a minimum distance can be defined. In the specific example of TLSH, a maximum distance of 50 is commonly considered "close." Evident here, the distance between S1 and S5 is 14, the distance between S5 and S6 is 3, the distance between S6 and S10 is 22. All of these fall within the minimum clustering distance, and so S1, S5, S6, and S10 form a micro-cluster 316-1. However, the distance between S10 and S9 is 78, which is greater than the threshold. Thus, once the system identifies an adjacent sample that is above the threshold, micro-cluster 316-1 is closed out.

The system then continues scanning the sorted container to identify additional micro-clusters such as micro-cluster 316-2.

Once micro-clusters have been found, their member samples may be excluded from the sorted container, and a new sorted container may be formed that includes only those samples that did not cluster in the first pass. However, performing a second pass with the same vantage sample 304 would yield the same results because the distances would not change. Thus, a new vantage sample is selected. In an illustrative case, the new vantage sample is a median sample 320-1, or in other words, the sample in the middle of the new sorted container once the micro-clustered samples have been removed. In this case, sample eight will be the median sample once the samples of micro-clusters 316-1 and 316-2 are removed.

Figure 3D:
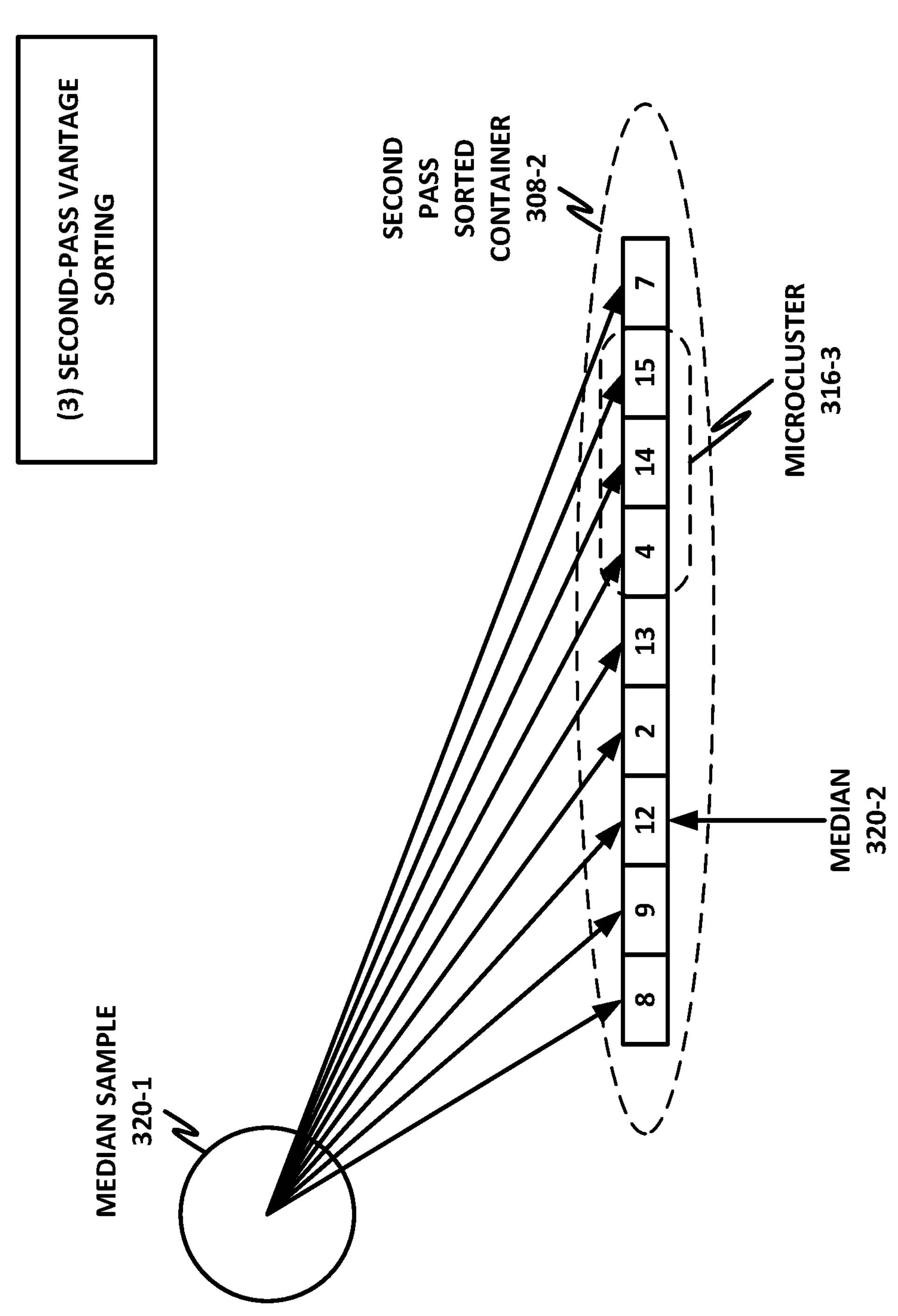

Turning to FIG. 3*d*, a second pass is performed using median sample 320-1 as the new vantage sample, to create second pass sorted container 308-2. Because median sample 320-1 is different from vantage sample 304, the next pass will yield different results. Once again, the samples are sorted according to their distance from median sample 320-1, and the system then scans adjacent samples to identify samples that are closer to one another than the threshold. In this case, a new micro-cluster 316-3 is identified within second pass sorted container 308-2. Micro-cluster 316-3 can then be removed from second pass sorted container 308-2 to form yet another new sorted container. In this case, the median sample of samples left after removing micro-cluster 316-3 is sample 12, identified here as median 320-2.

Figure 3E:
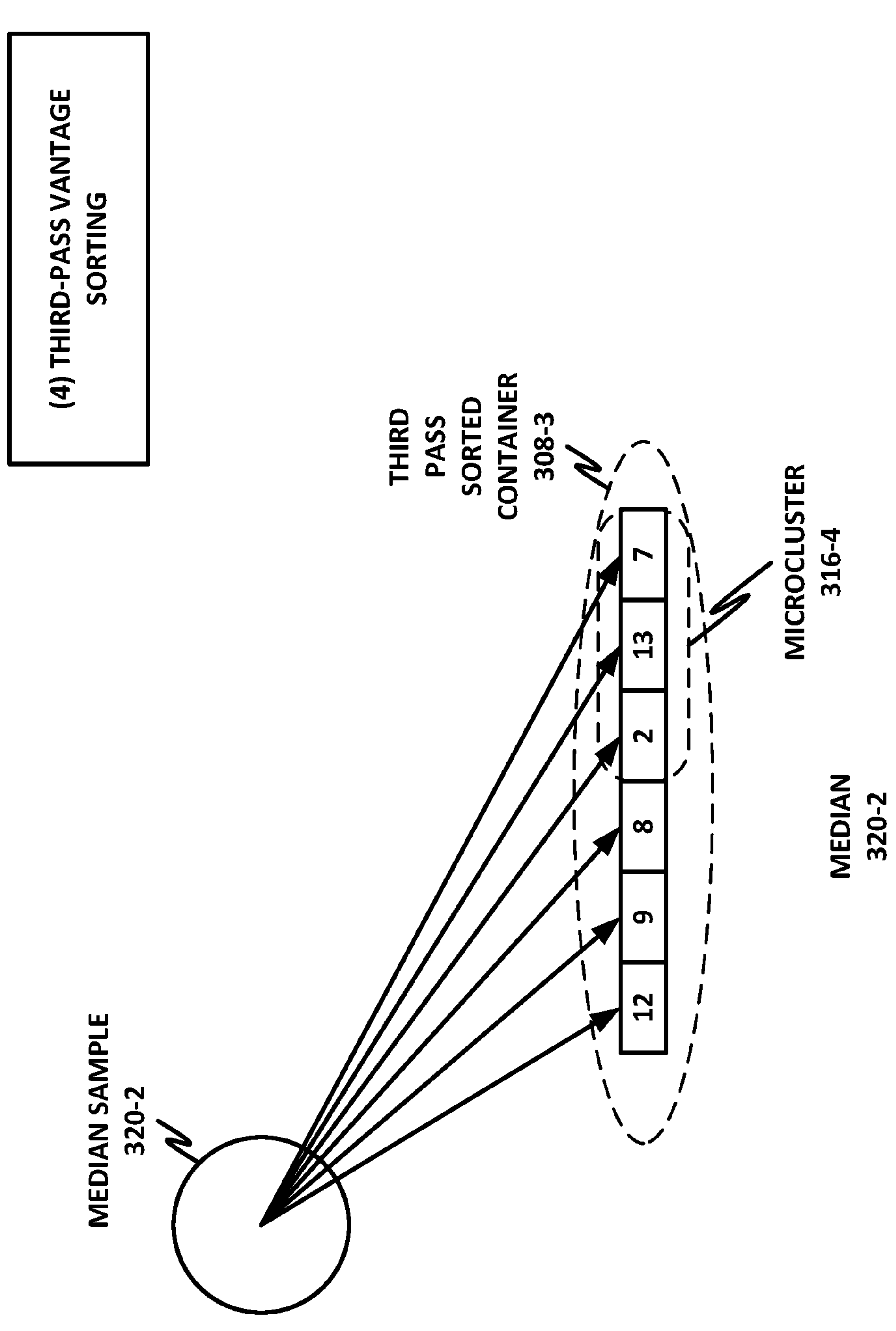

Turning to FIG. 3*e*, third pass vantage sorting is illustrated. In this case, median sample 320-2 is used as the vantage point. Once again, the distance between each remaining sample and median sample 320-2 is computed, and the results are sorted and stored in third pass sorted container 308-3. Adjacent samples are then checked for proximity less than the threshold. In this case, a new micro-cluster 316-4 is identified. Micro-cluster 316-4 may then be removed from third pass sorted container 308-3, which now has only three samples left.

Figure 3F:
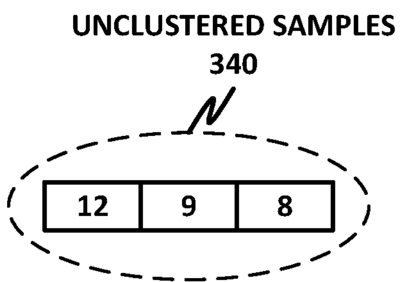

Turning to FIG. 3*f*, after a certain number of iterations, some samples may remain unclustered. For example, after a number of iterations, there may be a iteration where no new samples are formed. Once the system reaches an iteration where no new micro-clusters are formed, then the method may terminate. Furthermore, after a number of passes, there may be diminishing returns in the micro-clustering algorithm. Thus a variable MAX_PASSES may be defined, and iterations continue until either no new micro-clusters are formed, or until MAX_PASSES is reached. At that point, unclustered samples 340 simply remained unclustered.

While more complex algorithms such as DBSCAN attempt to cluster every sample into a cluster, the method of the present specification need not be concerned with unclustered samples. One purpose of the method is to define smaller micro-clusters that can be used to create meaningful signatures for identifying objects that would cluster with these micro-clusters. By way of illustration, a DBSCAN cluster that has 100 objects may be reduced to a set of three micro-clusters that have 30 objects each. In this case, some outliers will be left unclustered. But from the three micro-clusters that form, it may be more practical to craft a signature that reads on every sample in that micro-cluster. This new signature may be broad enough to capture other similar objects, while being narrow enough to avoid too many false positives. Thus, the micro-clustering algorithm may yield more clusters, and thus provide more signatures, while the signatures that are provided may be more useful and practical. Furthermore, the exclusion of certain points that do not cluster may not be problematic, because the signature of clusters that do form is still a useful tool for identifying malicious objects in the wild.

This method may not, and may not be intended to, form perfect clusters, in the sense that it will form clusters that are smaller than necessary. For example, micro-cluster 316-1 might theoretically have incorporated sample 12 using a different clustering algorithm. However, sample 12 never had a chance to be sorted into cluster 316-1, because cluster 316-1 closed out immediately in the first pass, which removed the theoretical possibility of including sample 12 in a later pass. However, the intent of this method is not necessarily to produce the largest possible cluster, but to produce micro-clusters that are precise enough to be used for signature authoring, or other purpose for which two smaller clusters may serve just as well as (or better than) one large cluster.

FIG. 4 is a graph illustrating a visual plot of micro-clustering valleys. For example, valley 404-1 forms a cluster. These valleys are surrounded by objects that have large distances from one another, while the valleys represent groups of objects that are very near one another. Thus visually, these valleys represent the micro-clusters.

Figure 5:
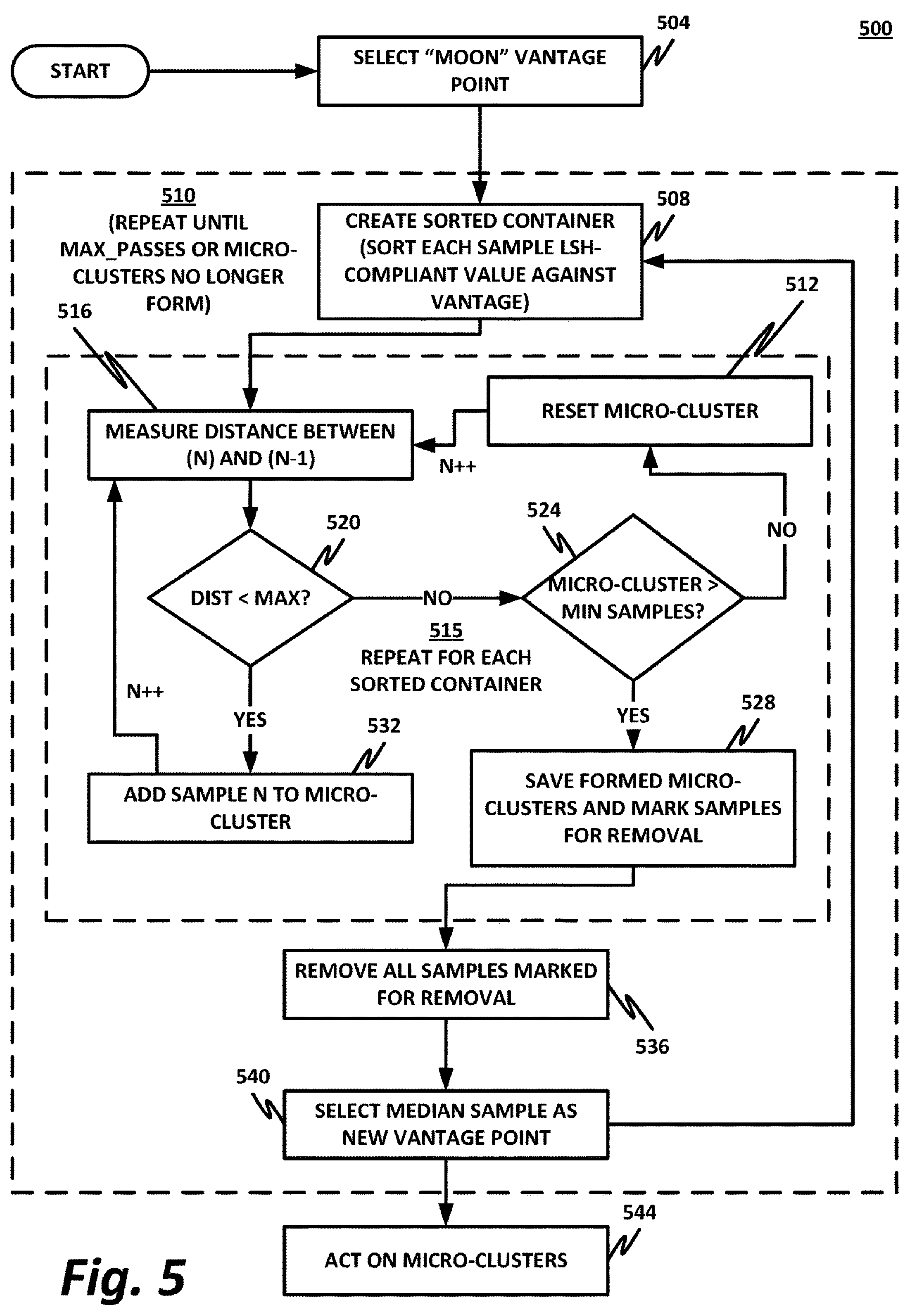
FIG. 5 is a flowchart of selected elements of a clustering method.

FIG. 5 is a flowchart of selected elements of a method 500 of performing micro-clustering. Method 500 may be carried out on any suitable hardware platform, such as hardware platform 6 illustrated below, or any other computing architecture. Furthermore, aspects of method 500 may be virtualized as in FIG. 7 below, or containerized as in FIG. 8.

In block 504, the system selects a "Moon" vantage point. The Moon vantage point is intended to be a point that is dissimilar from all points in the unsorted set of objects in a sample universe.

Meta-block 510 represents operations that are repeated until MAX_PASSES has been reached, or until micro-clusters no longer form in a pass. In one illustrative example, MAX_PASSES may be on the order of 6 to 10 passes. In some cases, beyond that, diminishing returns are experience.

In block 508, the system creates a sorted container including all objects in the sample universe. To create this sorted container, the system sorts each sample using an LSH-compliant value against the vantage point. In the case of the first pass, the vantage point is the previously selected "moon" vantage point. In subsequent passes, the vantage point may be a vantage point selected from the remaining objects in the sorted container after a pass.

Meta-block 515 represents a process that is iterated for each sorted container. Starting in block 516, the system selects a sample (N) and a sample (N−1), representing an adjacent sample. The system measures the distance between (N) and (N−1), such as according to an LSH-compliant distance measurement.

In decision block 520, the system determines whether the distance between the two samples is less than the threshold or maximum distance.

If the distance is less than the threshold, the two points are to be clustered together. In that case, in block 532, sample (N−1) is added to the micro-cluster that (N) belongs to. The system then increments N (N++) and control returns to block 516, where the next sample is checked.

Returning to decision block 520, if the distance between the two samples is greater than MAX_DIST, then in block 524 the system determines whether the current micro-cluster is greater than a threshold of minimum samples for a micro-cluster. This is to ensure that micro-clusters are not formed with too few samples (e.g., with two or only a few samples, depending on the design constraints). If the micro-cluster is too small, then in block 512 the system resets the micro-cluster, meaning that the objects that were clustered into that micro-cluster remain unclustered for this pass. N is then incremented (N++), and control returns to block 516.

Returning to decision block 524, if the number of samples in the micro-cluster is greater than the minimum micro-cluster size, then in block 528, the system saves the formed micro-cluster and marks the clustered samples for removal.

After clusters have been formed in meta-block 515, in block 536 the system removes from the sorted container all samples that were marked for removal (i.e., samples that were clustered in that pass).

In block 540, the system selects a new vantage point for the next pass through meta-block 510. In an illustrative example, this may be the median sample in the remaining sample set after clustered samples have been removed.

If this is not the last pass through the method, then control returns to block 508, and another pass is performed on the newly sorted container.

After all passes are complete, in block 544 the system may act on the micro-clusters. For example, an automated system, or a human user may examine the samples and craft a signature that reads on all samples in a micro-cluster. One signature may be crafted per micro-cluster, and these signatures can then be provided to antivirus or other detection software on client machines. These signatures can be used to beneficially identify malicious software that may be encountered in the wild. Advantageously, the signatures may be broader than a simple hash of an object, which will only catch identical objects. Signatures are useful because without signatures, malware authors can simply change a few bytes within a file to pass malware scans. But with strong signature matching, it is much more difficult for malware authors to change their products without losing functionality. However, if the signatures are too broad, then they will catch many false positives. Thus, by crafting signatures that read on micro-clusters (instead of attempting to craft signatures that read on large clusters from algorithms such as DBSCAN), the system may provide more beneficial and targeted malware detection.

FIGS. **6*a*-8** illustrate selected elements of a first stage of a targeted clustering algorithm. This method may begin with a universe of samples represented by an LSH-compliant scheme. The method begins by defining one or more vantage points.

Figure 6A:
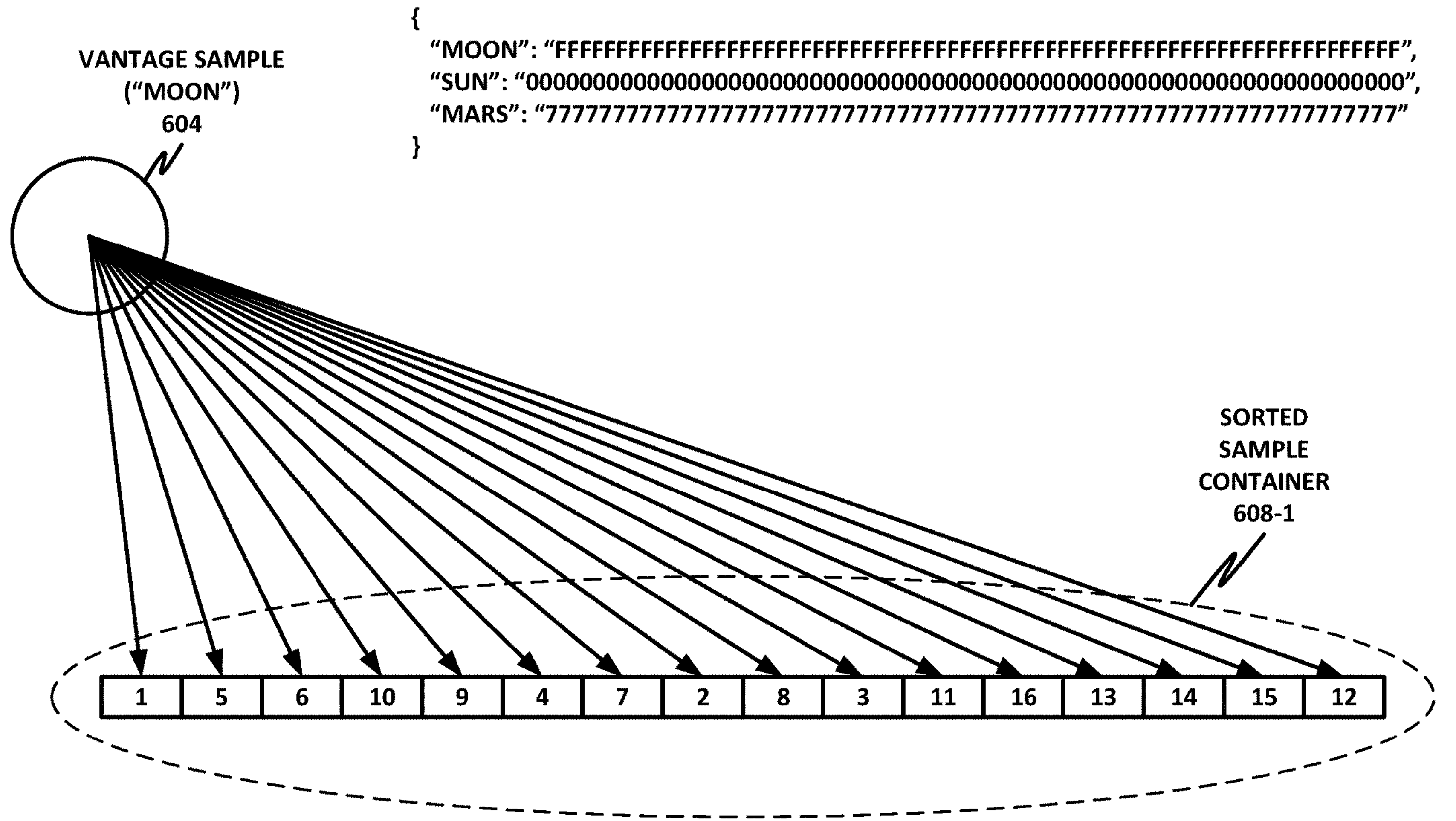
FIGS. 6*a*-6*c* are a block diagram illustration of selected elements of creating sorted containers from a plurality of vantage points.
Figure 6B:
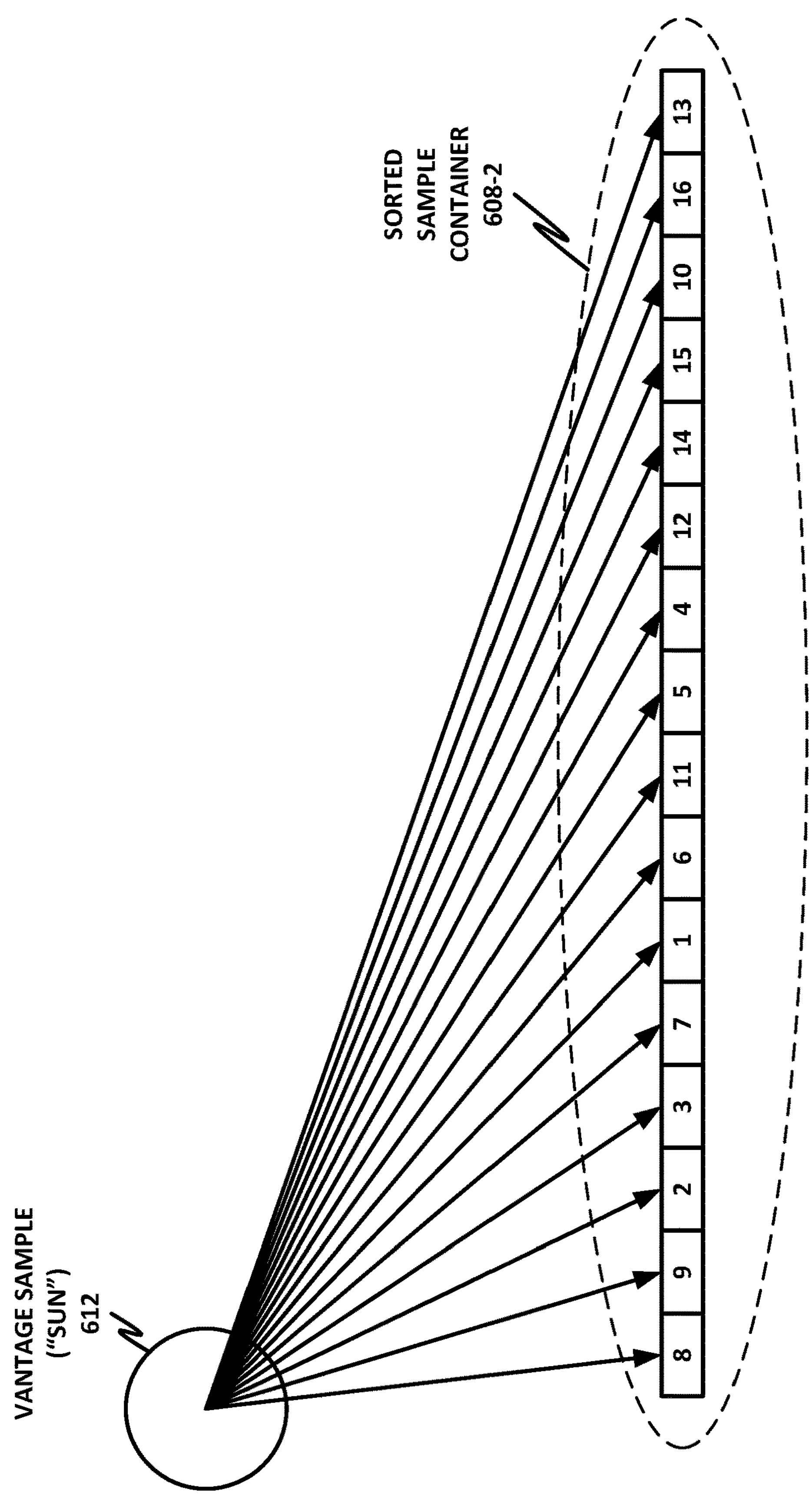
Figure 6C:
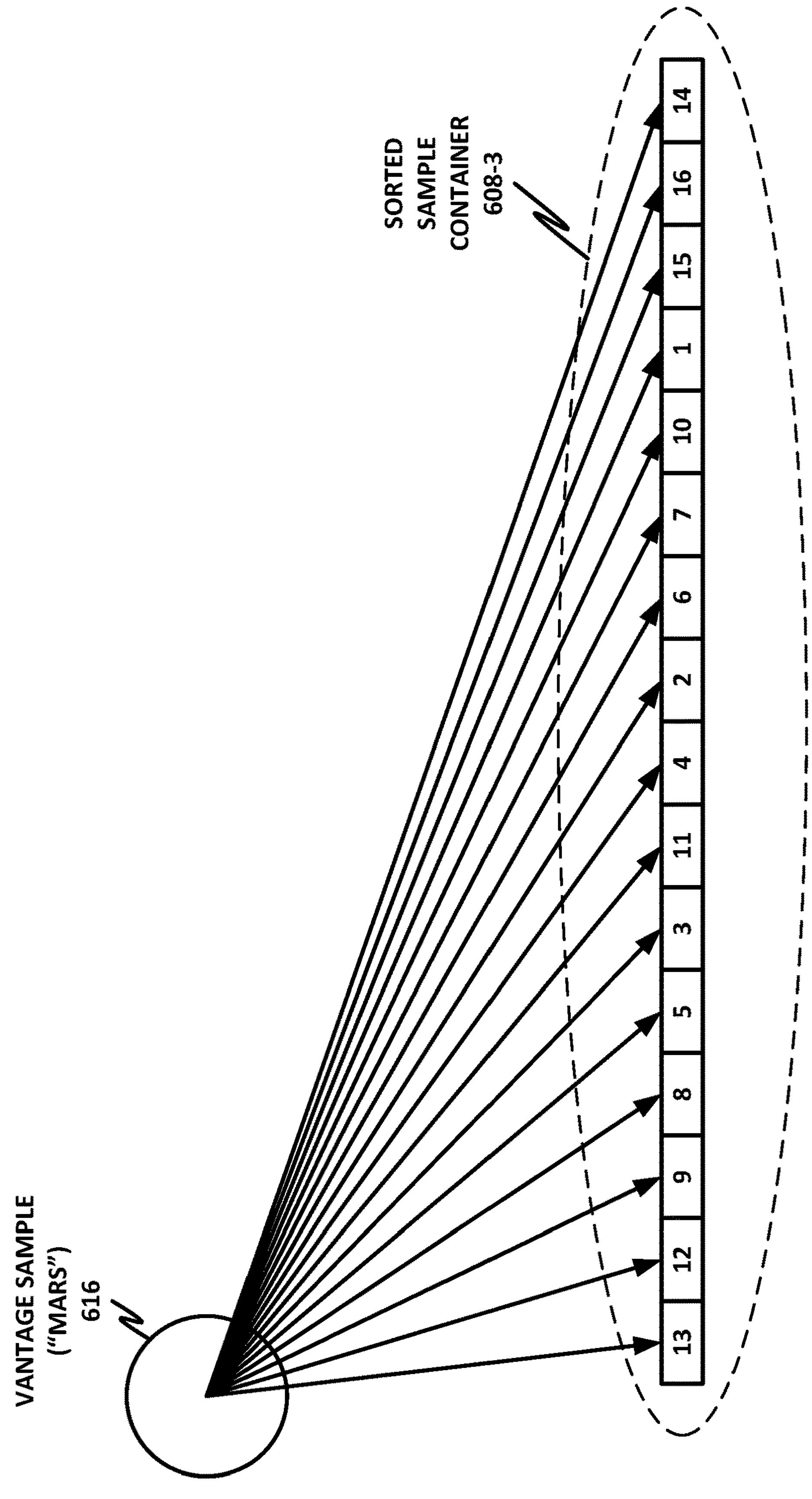

In this example, FIG. **6*a* illustrates vantage sample Moon 604. FIG. 6*b* illustrates vantage sample Sun 612. FIG. 6*c* illustrates vantage sample Mars 616**. As in other examples, the vantage samples may be selected with each character being a same digit, a pattern, a random value, or some other sequence that is unlikely to occur in a real-world sample, and thus is expected to be a substantial distance from real-world samples.

The present method does not impose an arbitrary limit on the number of vantage points, but the number of vantage points may be limited to avoid increasing the complexity of the algorithm beyond the desired parameters of a particular embodiment. A single vantage point may be sufficient for a smaller universe, but as the universe grows, there may be benefits to having a plurality of vantage points to increase performance when querying a given sample. In this example, three vantage points are shown, which represents a reasonable trade-off between accuracy and performance for a large sample set, such as a universe of millions or billions of classified malware or benign samples.

Once the dictionary of vantage points has been defined, the system may measure the LSH-compliant distances between each sample in the universe and each vantage point. The samples are then stored in sorted containers, as described above, with one sorted container for each vantage point. Thus, in the case of three vantage points, three sorted containers will be provided. These are illustrated as sorted sample container 608-1 of FIG. 6*a*, sorted sample container 608-2 of FIG. 6*b*, and sorted sample container 608-3 of FIG. 6C. Note that sorted sample containers 608 result in different sortings because they are measured against different vantage points.

Figure 7:
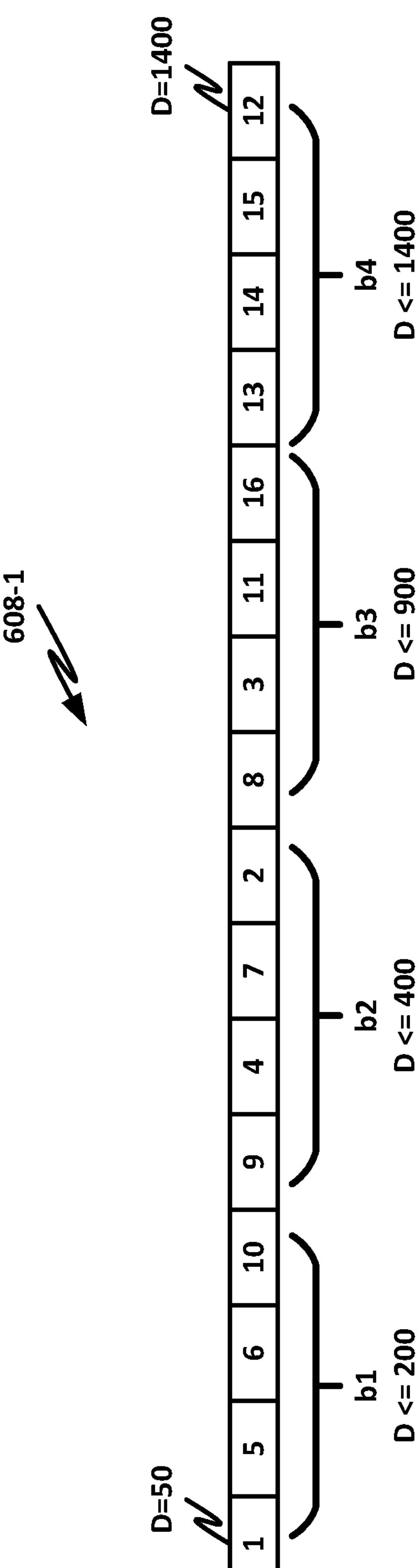
FIG. 7 is a block diagram illustration of selected elements of a bucketized sorted container.

FIG. 7 is a block diagram illustrating the creation of buckets from sorted sample containers. Because the containers are sorted, the system may obtain a range of differences. For example, in FIG. 7, sorted sample container 608-1 has distances in the range of 50 at the low-end for sample 1, and 1400 at the high-end for sample 12. The sorted container can then be divided into several buckets containing samples within given ranges. In this example, for illustration purposes, sorted container 608-1 has been divided into four buckets, namely B1, B2, B3, and B4. Bucket B1 contains samples whose distance from vantage point Moon 604 is less than 200. Bucket B2 contains samples whose distance is less than or equal to 400 but greater than 200. Bucket B3 includes samples whose distance is less than or equal to 900, but greater than 400. Bucket B4 include samples whose distance is less than or equal to 1400, but greater than 900.

FIG. 7 illustrates splitting sorted container 608-1 into a plurality of discrete buckets. The same operation may be performed for sorted containers 608-2, and 608-3, although the buckets are not shown here to simplify the figure. These buckets may be formed on the same principles as for sorted container 608-1, although the ranges may be different, and may be chosen based on the total range of distances of samples from vantage points Sun 612 and Mars 616. Selection of boundaries for the ranges may be performed manually (e.g., by a human user), or may be automatically computed such as by attempting to divide the sample set such that each bucket contains approximately the same number of samples, or such that each bucket has approximately the same range of values. Other slicing algorithms may be used.

Figure 8:
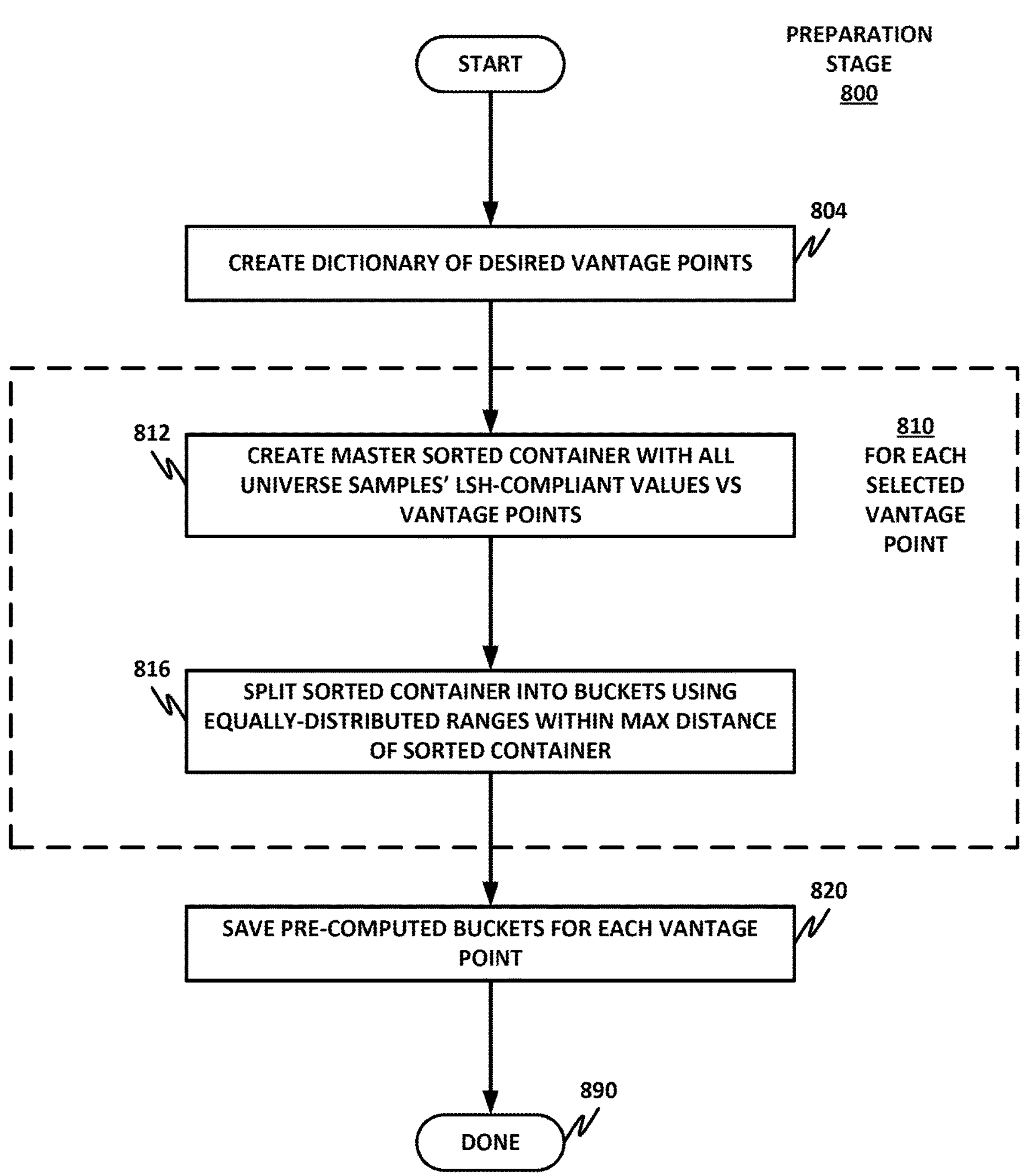
FIG. 8 is a flow chart illustrating selected elements of a data preparation method.

FIG. 8 is a flowchart of selected elements of a preparation stage of a targeted clustering method 800.

In block 804, the system may create a dictionary of desired vantage points to be used for bucketizing samples. In the example illustrated here, three vantage points are chosen, named Moon, Sun, and Mars. These names are for convenience only, and do not have any special meaning with respect to the method.

Meta-block 810 is an operation that is performed for each selected vantage point.

In block 812, the system creates a master sorted container with the full universe of samples. This may be based on the samples' LSH-compliant values measured against the given vantage point (e.g., Moon, Sun, or Mars).

In block 816, the system splits the sorted container into X buckets using an appropriate range, such as an equidistant distribution range within the maximum distance of the sorted container. Other examples may include creating substantially equal size buckets, or any other distribution method.

In block 820, the system saves the precomputed buckets for each vantage point in a data structure that can be used for later targeted clustering.

In block 890, the method is done.

Figure 9:
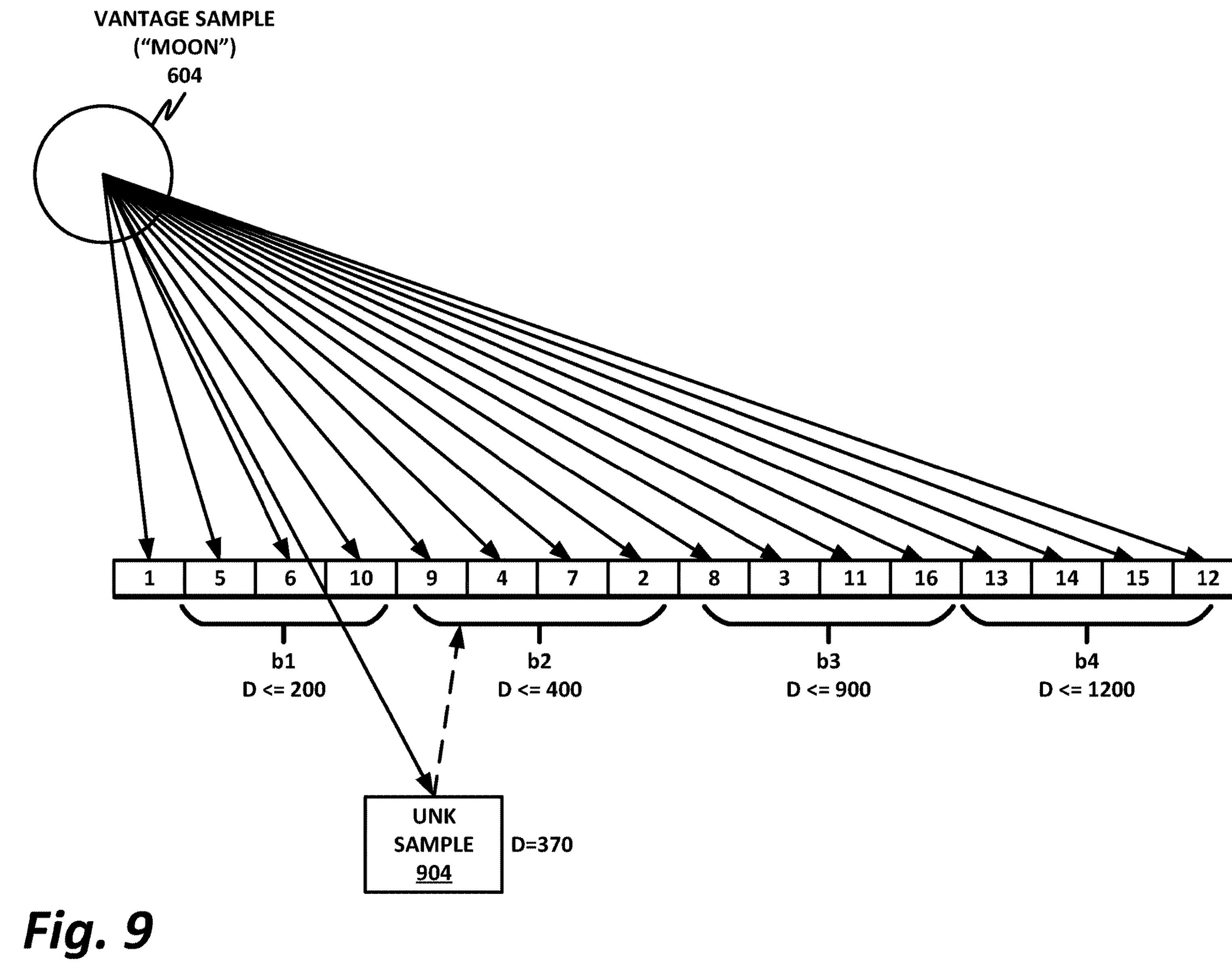
FIG. 9 is a block diagram illustration of assigning an unknown sample to a bucket.

FIGS. 9-12 illustrate selected elements of a second stage of the targeted clustering algorithm. In this stage, as illustrated in FIG. 9, the system starts with a sample of interest such as unknown sample 904. The system first computes the LSH-compliant distance between unknown sample 904 and each vantage point. In FIG. 9, by way of illustration, a distance from vantage point Moon 604 is illustrated. In this case, the LSH-compliant distance from Moon 604 to unknown sample 904 is 370. The system will also compute distances from vantage points Sun 612 and Mars 616 to unknown sample 904.

Returning to the illustrative example of vantage Moon 604, with a distance of 370, unknown sample 904 initially falls into bucket B2, which is for samples whose distance is greater than 200 and less than or equal to 400. Because the universe of samples were already bucketed in the previous preparation stage, it is straightforward to select bucket B2 as the appropriate bucket for unknown sample 904.

To account for "edgy" neighbors (e.g., in the case that some near neighbors may fall in an adjacent bucket), the system also selects adjacent buckets, namely N−1 and N+1. In this case, because unknown sample 904 belongs to bucket B2, the system also selects bucket B1 (N−1) and bucket B3 (N+1). Alternatively, the system could select no adjacent buckets, or only one adjacent bucket, such as the adjacent bucket closest to the target sample. In this example, because unknown sample 904 has a distance of 370, this would mean selecting bucket B3, because 370 is closer to the B3 edge of bucket B2 (400) than the B1 edge of bucket B2 (200). The remainder of this description operates on an example where both adjacent buckets are used.

The selected buckets may then be consolidated into meta-buckets on a vantage point basis. For example, buckets B1, B2, and B3 for the Moon sample will be treated as a single meta-bucket. Similarly, whichever three blocks are selected for the Sun sample will form a second meta-bucket, and the three buckets selected for Mars sample will form a third meta-bucket.

Figure 10:
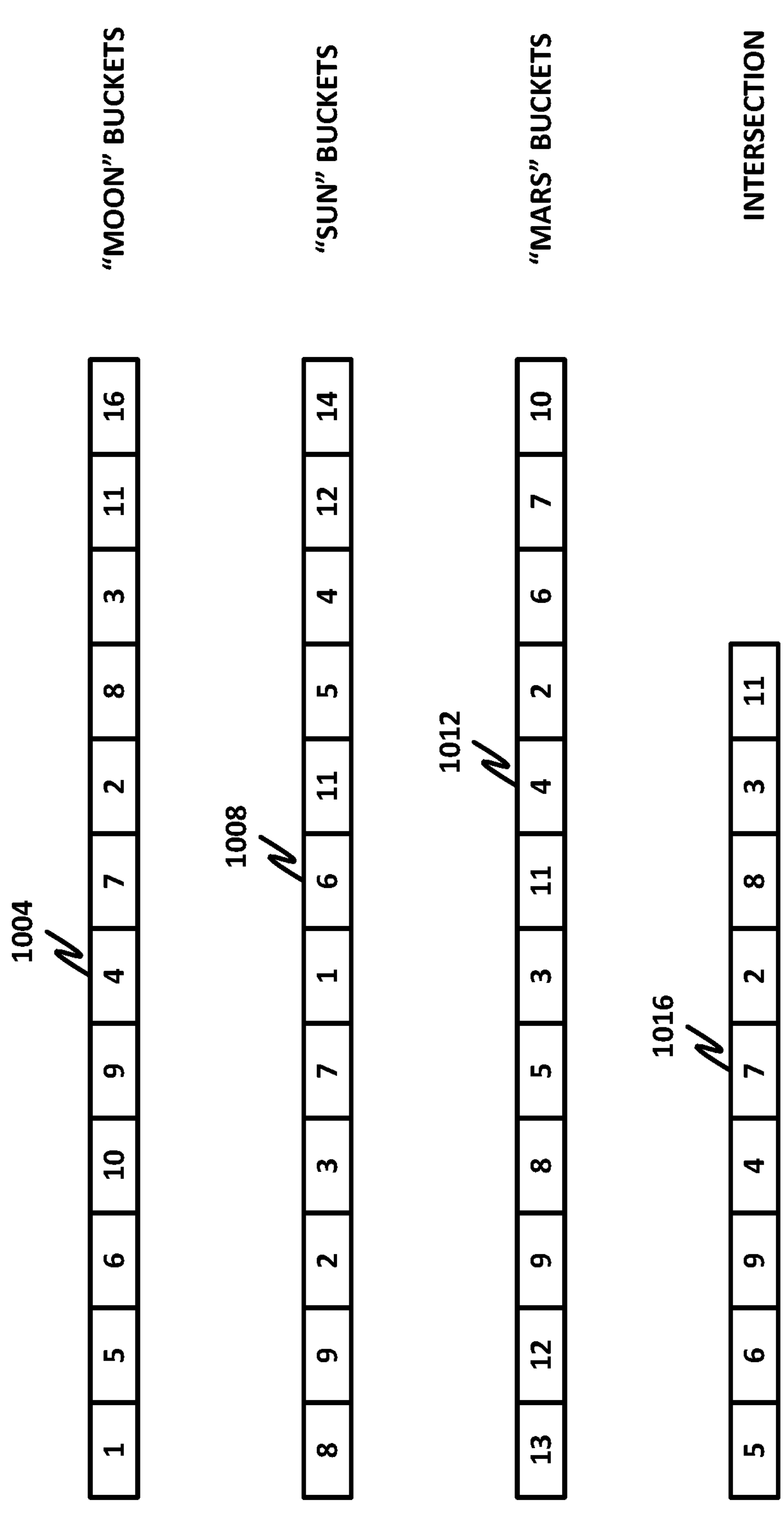
FIG. 10 is a block diagram illustration of reducing a set of meta-buckets to an intersection bucket.

The three consolidated meta-buckets are illustrated in FIG. 10, which is a block diagram illustration of consolidated buckets. Meta-bucket 1004 is a consolidation of three Moon buckets. Meta-bucket 1008 is a consolidation of three Sun buckets. And meta-bucket 1012 is a consolidation of three Mars buckets.

The system may then compute an intersection between the three meta-buckets. In other words, the system may keep only samples that are present in all three meta-buckets. This intersection group narrows down the number of samples to be used when forming clusters for the target sample.

In this case, bucket 1016 is illustrated as the intersection bucket. In this case, three samples have been dropped because those three samples are not present in all three consolidated meta-buckets. The remaining samples of intersection bucket 1016 are present in all three of 1004, 1008, and 1012.

Figure 11:
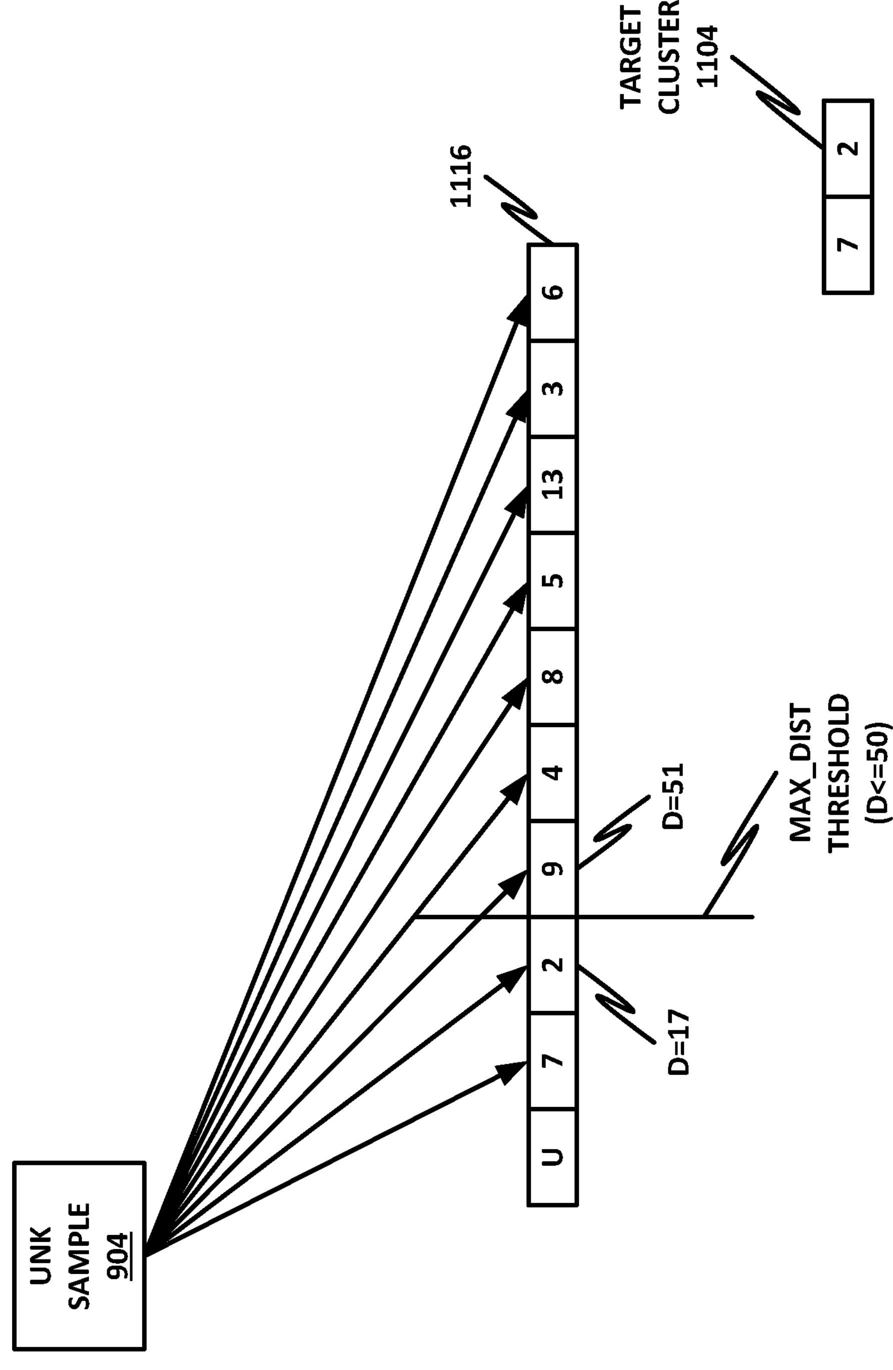
FIG. 11 is a block diagram illustration of selected elements of laser cutting.

FIG. 11 illustrates the creation of a new sorted container with all the samples from the intersection group. This time, rather than using one of the theoretical vantage points, the container is sorted using the distance between each sample and unknown sample 904. Thus, the resulting sorted container 1116 contains all the samples that were selected for intersection bucket 1016 of FIG. 10, sorted based on their distance from unknown sample 904.

To create a target cluster 1104, the system iterates through the sorted container 1116 from the beginning (starting with the sample closest to target sample 904), considering samples until it finds a sample whose distance from unknown sample 904 is greater than a threshold MAX_DIST. This is known as "laser cutting" the sample.

For example, in this case MAX_DIST is greater than or equal to 50. Samples 7 and 2 both have a distance less than 50, with sample 2 having a specified distance of 17. However, sample 9 has a distance of 51 from unknown sample 904. Because this is greater than the MAX_DIST threshold, sample 9 is excluded from target cluster 1104, and laser cutting terminates. By definition, all samples to the right of sample 9 in sorted container 1116 have a distance greater than or equal to sample 9, so no later samples will have a distance under MAX_DIST.

The result is that target cluster 1104, in this case, has two samples, namely sample 7 and sample 2. Note that this illustration is simplified as compared to a true data set, which may have millions or billions of samples. However, the operative principle holds. By considering a limited set of samples in a small number of buckets (e.g., two or three buckets) per vantage point, the method may quickly narrow the set down to a much smaller set of target samples. This set may be orders of magnitude smaller than the full sample set, and represents a group of samples that the unknown sample would likely cluster tightly with if a full-scale clustering algorithm (e.g., DBSCAN or K-Means) were run on the entire sample set (with the new unknown sample included).

The system may then act on the grouping of unknown sample 904 with target cluster 1104. For example, the system may determine attributes of samples 7 and 2, including their categories. If all samples in target cluster 1104 have a common label (e.g., "Malicious"), then the same label may be applied to unknown sample 904 with high confidence. If more than one label is present (e.g., a mix of "Malicious," "Suspicious," and/or "Safe"), then another algorithm may be used, such as majority voting. For example, if target cluster 1104 has 25 samples marked "Malicious" and 4 samples marked "Suspicious," the Malicious label may still be used for target sample 904. On the other hand, if target cluster 1104 has 25 samples marked "Safe" and 4 samples marked "Malicious," there is still a chance that unknown sample 904 is malicious. Thus, unknown sample 904 may receive a preliminary "safe" reputation, but may be marked for further analysis, such as detonating the sample, or performing static and/or dynamic analysis.

Alternatively, if unknown sample 904 were found to be a distance of greater than 50 from sample 7, then then the laser cutting algorithm would not form a target cluster 1104 at all. In the case that unknown sample 904 does not cluster well with any known samples, it may be a good candidate for detonation or other more detailed analysis.

Figure 12:
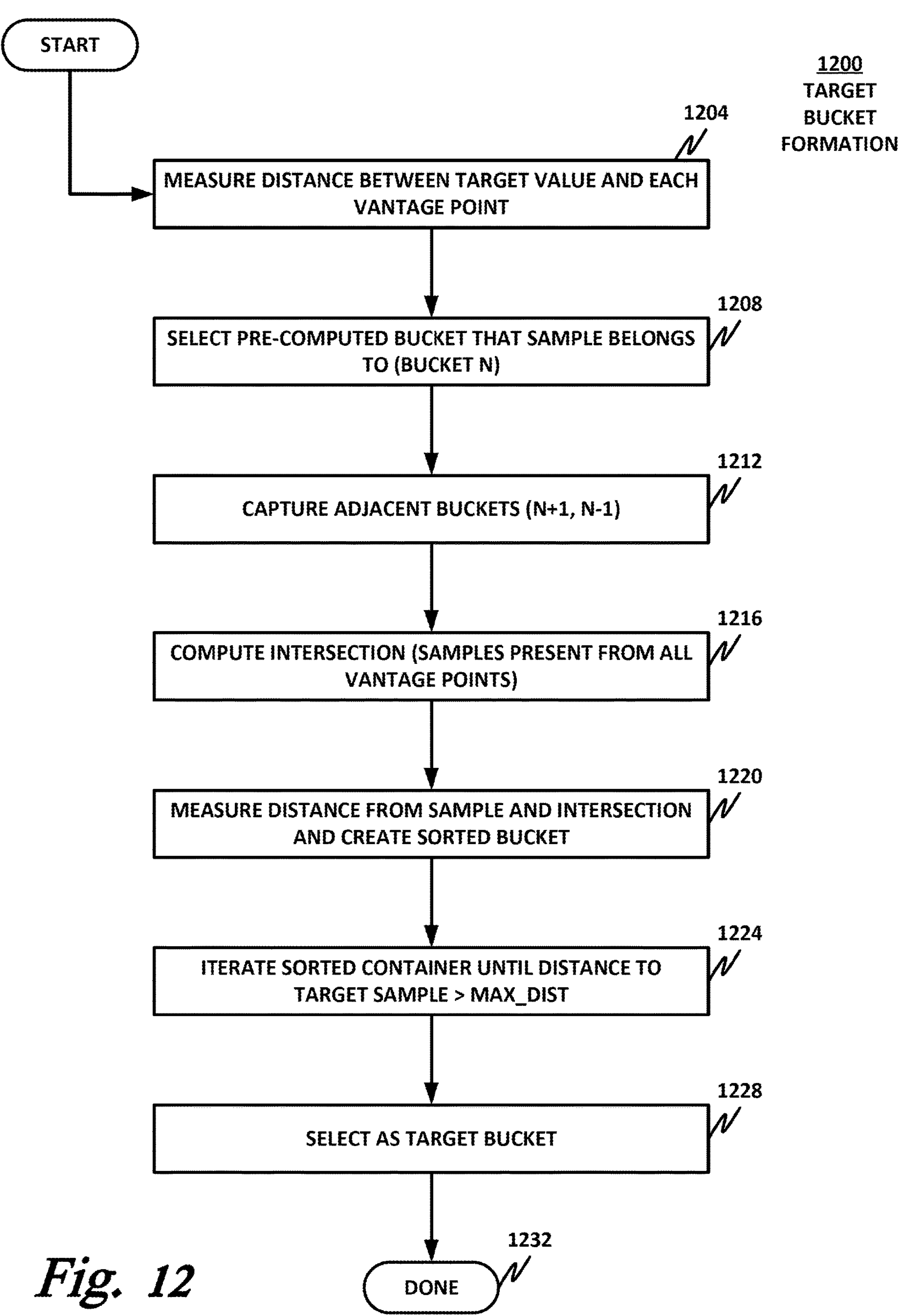
FIG. 12 is a flow chart illustrating selected elements of a target bucket formation method.

FIG. 12 is a flowchart of selected elements of a method 1200 of performing the second stage of the targeted clustering algorithm. Method 1200 may be performed each time a sample is analyzed, and advantageously can yield results in real-time or near real-time, as opposed to a full clustering algorithm that may take dozens of minutes or hours.

In block 1204, the system measures the distance between the target (e.g., unknown) sample's LSH-compliant value and each vantage point's LSH-compliant value. For example, the system may measure a distance between unknown sample 904 and each of Moon 604, Sun 612, and Mars 616.

In block 1208, based on the distance to each vantage point, the system may select a precomputed bucket or buckets that the new unknown sample belongs to.

In block 1212, to account for edgy samples, the system may also add adjacent buckets such as N+1 and N−1, and consolidates those buckets into an individual meta-bucket for each vantage point. This may help to increase precision.

In block 1216, the system computes the intersection group that contains samples that are present in all three meta-buckets. Any samples that are present in only one or two meta-buckets are dropped from the intersection group.

In block 1220, the system measures the distance between the target sample and each sample in the intersection group. From these distances, the system creates a new sorted container of the samples in the intersection group.

In block 1224, the system laser cuts the sorted container, iterating through the sorted container and collecting samples until the distance to the target sample exceeds a threshold MAX_DIST.

In block 1228, the system keeps, for the target bucket, those samples that were less than the threshold distance. The system may then act on the target bucket, such as propagating one or more labels from the target bucket to the unknown sample.

In block 1232, the method is done.

Figure 13:
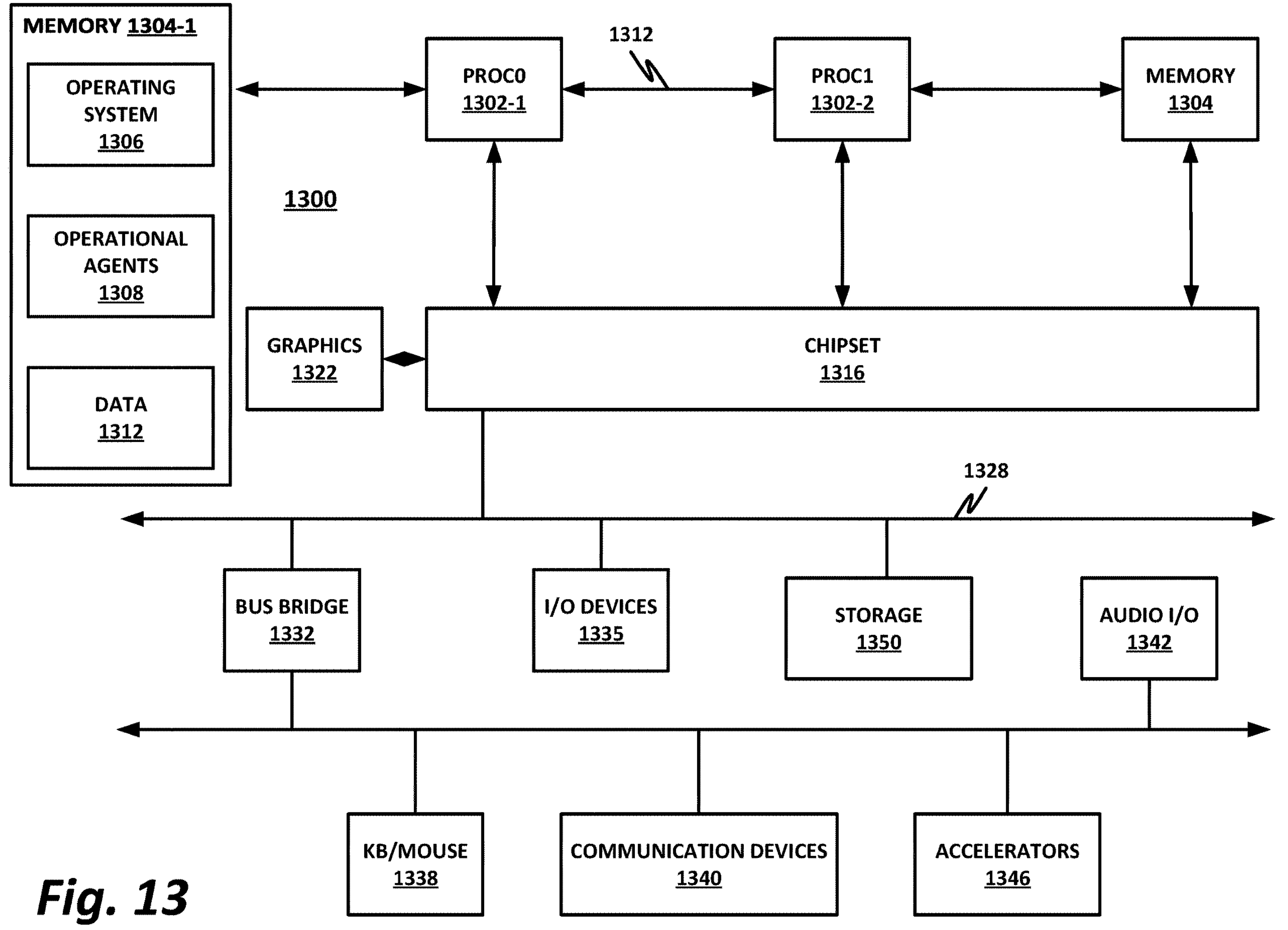
FIG. 13 is a block diagram of selected elements of a hardware platform.

FIG. 13 is a block diagram of a hardware platform 1300. Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Hardware platform 1300 may provide a host system to carry out any of the functions, for example, of FIGS. 1-12.

Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 1300, even though they may be scattered across a data center, or even located in different data centers.

Hardware platform 1300 is configured to provide a computing device. In various embodiments, a "computing device" may be or comprise, by way of nonlimiting example, a computer, workstation, server, mainframe, virtual machine (whether emulated or on a "bare metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, internet protocol (IP) telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 1300 is arranged in a point-to-point (PtP) configuration. This PtP configuration is popular for personal computer (PC) and server-type devices, although it is not so limited, and any other bus type may be used.

Hardware platform 1300 is an example of a platform that may be used to implement embodiments of the teachings of this specification. For example, instructions could be stored in storage 1350. Instructions could also be transmitted to the hardware platform in an ethereal form, such as via a network interface, or retrieved from another source via any suitable interconnect. Once received (from any source), the instructions may be loaded into memory 1304, and may then be executed by one or more processor 1302 to provide elements such as an operating system 1306, operational agents 1308, or data 1312.

Hardware platform 1300 may include several processors 1302. For simplicity and clarity, only processors PROC0 1302-1 and PROC1 1302-2 are shown. Additional processors (such as 2, 4, 8, 16, 24, 32, 64, or 128 processors) may be provided as necessary, while in other embodiments, only one processor may be provided. Processors may have any number of cores, such as 1, 2, 4, 8, 16, 24, 32, 64, or 128 cores.

Processors 1302 may be any type of processor and may communicatively couple to chipset 1316 via, for example, PtP interfaces. Chipset 1316 may also exchange data with other elements, such as a high performance graphics adapter 1322. In alternative embodiments, any or all of the PtP links illustrated in FIG. 13 could be implemented as any type of bus, or other configuration rather than a PtP link. In various embodiments, chipset 1316 may reside on the same die or package as a processor 1302 or on one or more different dies or packages. Each chipset may support any suitable number of processors 1302. A chipset 1316 (which may be a chipset, uncore, Northbridge, Southbridge, or other suitable logic and circuitry) may also include one or more controllers to couple other components to one or more central processor units (CPU).

Two memories, 1304-1 and 1304-2 are shown, connected to PROC0 1302-1 and PROC1 1302-2, respectively. As an example, each processor is shown connected to its memory in a direct memory access (DMA) configuration, though other memory architectures are possible, including ones in which memory 1304 communicates with a processor 1302 via a bus. For example, some memories may be connected via a system bus, or in a data center, memory may be accessible in a remote DMA (RDMA) configuration.

Memory 1304 may include any form of volatile or nonvolatile memory including, without limitation, magnetic media (e.g., one or more tape drives), optical media, flash, random access memory (RAM), double data rate RAM (DDR RAM) nonvolatile RAM (NVRAM), static RAM (SRAM), dynamic RAM (DRAM), persistent RAM (PRAM), data-centric (DC) persistent memory (e.g., Intel Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 1304 may be used for short, medium, and/or long-term storage. Memory 1304 may store any suitable data or information utilized by platform logic. In some embodiments, memory 1304 may also comprise storage for instructions that may be executed by the cores of processors 1302 or other processing elements (e.g., logic resident on chipsets 1316) to provide functionality.

In certain embodiments, memory 1304 may comprise a relatively low-latency volatile main memory, while storage 1350 may comprise a relatively higher-latency nonvolatile memory. However, memory 1304 and storage 1350 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 1304 and storage 1350, for example, in a single physical memory device, and in other cases, memory 1304 and/or storage 1350 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 1322 may be configured to provide a human-readable visual output, such as a command-line interface (CLI) or graphical desktop such as Microsoft Windows, Apple OSX desktop, or a Unix/Linux X Window System-based desktop. Graphics adapter 1322 may provide output in any suitable format, such as a coaxial output, composite video, component video, video graphics array (VGA), or digital outputs such as digital visual interface (DVI), FPDLink, DisplayPort, or high definition multimedia interface (HDMI), by way of nonlimiting example. In some examples, graphics adapter 1322 may include a hardware graphics card, which may have its own memory and its own graphics processing unit (GPU).

Chipset 1316 may be in communication with a bus 1328 via an interface circuit. Bus 1328 may have one or more devices that communicate over it, such as a bus bridge 1332, I/O devices 1335, accelerators 1346, communication devices 1340, and a keyboard and/or mouse 1338, by way of nonlimiting example. In general terms, the elements of hardware platform 1300 may be coupled together in any suitable manner. For example, a bus may couple any of the components together. A bus may include any known interconnect, such as a multi-drop bus, a mesh interconnect, a fabric, a ring interconnect, a round-robin protocol, a PtP interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 1340 can broadly include any communication not covered by a network interface and the various I/O devices described herein. This may include, for example, various universal serial bus (USB), FireWire, Lightning, or other serial or parallel devices that provide communications.

I/O Devices 1335 may be configured to interface with any auxiliary device that connects to hardware platform 1300 but that is not necessarily a part of the core architecture of hardware platform 1300. A peripheral may be operable to provide extended functionality to hardware platform 1300, and may or may not be wholly dependent on hardware platform 1300. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage, by way of nonlimiting example.

In one example, audio I/O 1342 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form.

Bus bridge 1332 may be in communication with other devices such as a keyboard/mouse 1338 (or other input devices such as a touch screen, trackball, etc.), communication devices 1340 (such as modems, network interface devices, peripheral interfaces such as PCI or PCIe, or other types of communication devices that may communicate through a network), audio I/O 1342, a data storage device 1344, and/or accelerators 1346. In alternative embodiments, any portions of the bus architectures could be implemented with one or more PtP links.

Operating system 1306 may be, for example, Microsoft Windows, Linux, UNIX, Mac OS X, IOS, MS-DOS, or an embedded or real-time operating system (including embedded or real-time flavors of the foregoing). In some embodiments, a hardware platform 1300 may function as a host platform for one or more guest systems that invoke application (e.g., operational agents 1308).

Operational agents 1308 may include one or more computing engines that may include one or more nontransitory computer-readable mediums having stored thereon executable instructions operable to instruct a processor to provide operational functions. At an appropriate time, such as upon booting hardware platform 1300 or upon a command from operating system 1306 or a user or security administrator, a processor 1302 may retrieve a copy of the operational agent (or software portions thereof) from storage 1350 and load it into memory 1304. Processor 1302 may then iteratively execute the instructions of operational agents 1308 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

In some cases, the function of an engine is described in terms of a "circuit" or "circuitry to" perform a particular function. The terms "circuit" and "circuitry" should be understood to include both the physical circuit, and in the case of a programmable circuit, any instructions or data used to program or configure the circuit.

Where elements of an engine are embodied in software, computer program instructions may be implemented in programming languages, such as an object code, an assembly language, or a high-level language such as OpenCL, FORTRAN, C, C++, JAVA, or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

A network interface may be provided to communicatively couple hardware platform 1300 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fiber Channel, InfiniBand, Wi-Fi, or other suitable standard. Intel Omni-Path Architecture (OPA), TrueScale, Ultra Path Interconnect (UPI) (formerly called QuickPath Interconnect, QPI, or KTI), FibreChannel, Ethernet, FibreChannel over Ethernet (FCOE), InfiniBand, PCI, PCIe, fiber optics, millimeter wave guide, an internet architecture, a packet data network (PDN) offering a communications interface or exchange between any two nodes in a system, a local area network (LAN), metropolitan area network (MAN), wide area network (WAN), wireless local area network (WLAN), virtual private network (VPN), intranet, plain old telephone system (POTS), or any other appropriate architecture or system that facilitates communications in a network or telephonic environment, either with or without human interaction or intervention. A network interface may include one or more physical ports that may couple to a cable (e.g., an Ethernet cable, other cable, or waveguide).

In some cases, some or all of the components of hardware platform 1300 may be virtualized, in particular the processor(s) and memory. For example, a virtualized environment may run on OS 1306, or OS 1306 could be replaced with a hypervisor or virtual machine manager. In this configuration, a virtual machine running on hardware platform 1300 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 13 may be combined in a SoC architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. An example of such an embodiment is provided in FIGURE QC. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), FPGAs, and other semiconductor chips.

Figure 14:
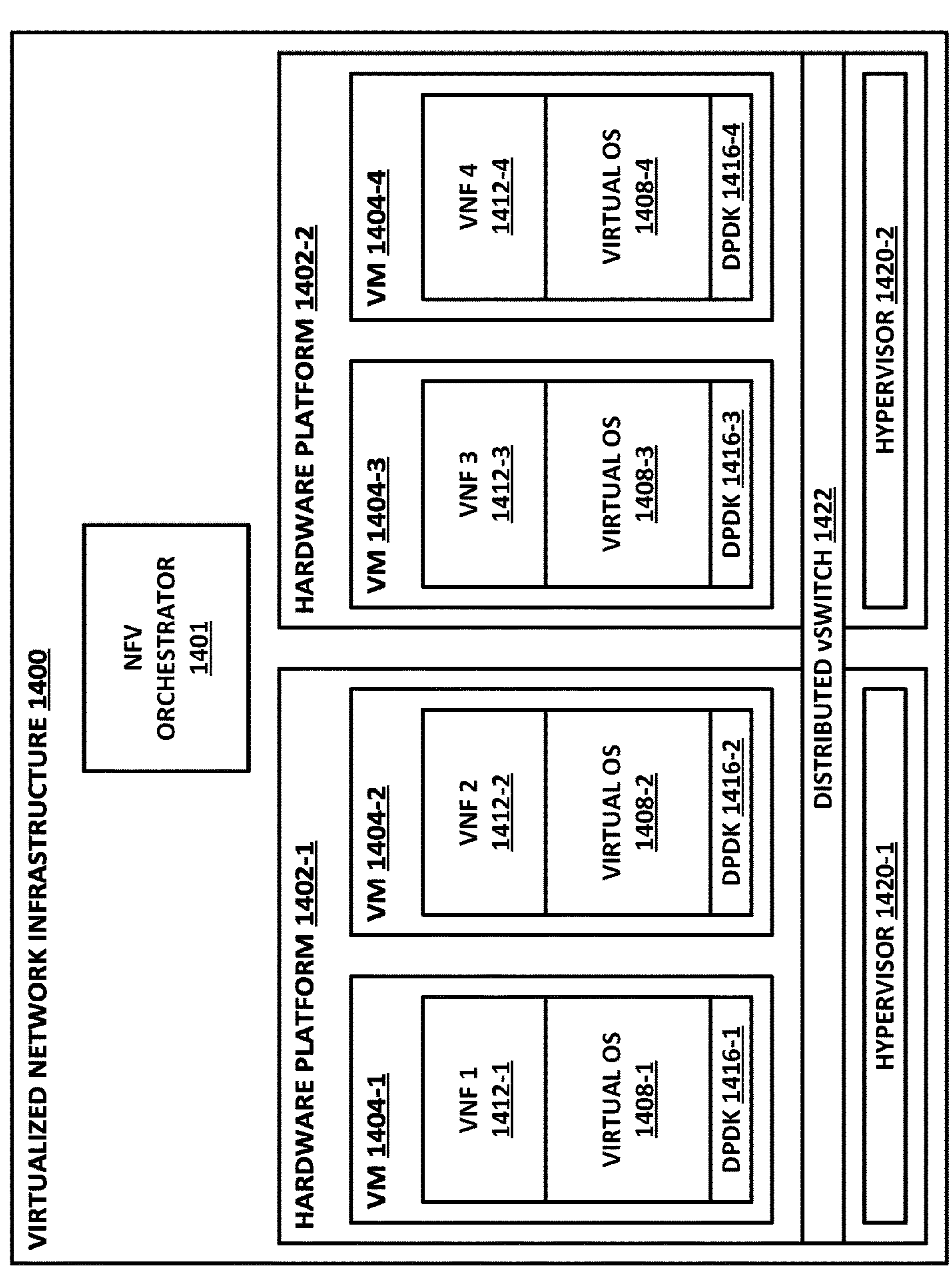
FIG. 14 is a block diagram of selected elements of a network function virtualization (NFV) infrastructure.

FIG. 14 is a block diagram of a NFV infrastructure 1400. NFV is an example of virtualization, and the virtualization infrastructure here can also be used to realize traditional VMs. Various functions described above may be realized as VMs. For example, any of the compute functions of FIGS. 1-12 may be virtualized.

NFV is generally considered distinct from software defined networking (SDN), but they can interoperate together, and the teachings of this specification should also be understood to apply to SDN in appropriate circumstances. For example, virtual network functions (VNFs) may operate within the data plane of an SDN deployment. NFV was originally envisioned as a method for providing reduced capital expenditure (Capex) and operating expenses (Opex) for telecommunication services. One feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, VNFs can be provisioned ("spun up") or removed ("spun down") to meet network demands. For example, in times of high load, more load balancing VNFs may be spun up to distribute traffic to more workload servers (which may themselves be VMs). In times when more suspicious traffic is experienced, additional firewalls or deep packet inspection (DPI) appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI), such as NFVI 1400. Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

In the example of FIG. 14, an NFV orchestrator 1401 may manage several VNFs 1412 running on an NFVI 1400. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus making NFV orchestrator 1401 a valuable system resource. Note that NFV orchestrator 1401 may provide a browser-based or graphical configuration interface, and in some embodiments may be integrated with SDN orchestration functions.

Note that NFV orchestrator 1401 itself may be virtualized (rather than a special-purpose hardware appliance). NFV orchestrator 1401 may be integrated within an existing SDN system, wherein an operations support system (OSS) manages the SDN. This may interact with cloud resource management systems (e.g., OpenStack) to provide NFV orchestration. An NFVI 1400 may include the hardware, software, and other infrastructure to enable VNFs to run. This may include a hardware platform 1402 on which one or more VMs 1404 may run. For example, hardware platform 1402-1 in this example runs VMs 1404-1 and 1404-2. Hardware platform 1402-2 runs VMs 1404-3 and 1404-4. Each hardware platform 1402 may include a respective hypervisor 1420, virtual machine manager (VMM), or similar function, which may include and run on a native (bare metal) operating system, which may be minimal so as to consume very few resources. For example, hardware platform 1402-1 has hypervisor 1420-1, and hardware platform 1402-2 has hypervisor 1420-2.

Hardware platforms 1402 may be or comprise a rack or several racks of blade or slot servers (including, e.g., processors, memory, and storage), one or more data centers, other hardware resources distributed across one or more geographic locations, hardware switches, or network interfaces. An NFVI 1400 may also include the software architecture that enables hypervisors to run and be managed by NFV orchestrator 1401.

Running on NFVI 1400 are VMs 1404, each of which in this example is a VNF providing a virtual service appliance. Each VM 1404 in this example includes an instance of the Data Plane Development Kit (DPDK) 1416, a virtual operating system 1408, and an application providing the VNF 1412. For example, VM 1404-1 has virtual OS 1408-1, DPDK 1416-1, and VNF 1412-1. VM 1404-2 has virtual OS 1408-2, DPDK 1416-2, and VNF 1412-2. VM 1404-3 has virtual OS 1408-3, DPDK 1416-3, and VNF 1412-3. VM 1404-4 has virtual OS 1408-4, DPDK 1416-4, and VNF 1412-4.

Virtualized network functions could include, as nonlimiting and illustrative examples, firewalls, intrusion detection systems, load balancers, routers, session border controllers, DPI services, network address translation (NAT) modules, or call security association.

The illustration of FIG. 14 shows that a number of VNFs 1404 have been provisioned and exist within NFVI 1400. This FIGURE does not necessarily illustrate any relationship between the VNFs and the larger network, or the packet flows that NFVI 1400 may employ.

The illustrated DPDK instances 1416 provide a set of highly-optimized libraries for communicating across a virtual switch (vSwitch) 1422. Like VMs 1404, vSwitch 1422 is provisioned and allocated by a hypervisor 1420. The hypervisor uses a network interface to connect the hardware platform to the data center fabric (e.g., a host fabric interface (HFI)). This HFI may be shared by all VMs 1404 running on a hardware platform 1402. Thus, a vSwitch may be allocated to switch traffic between VMs 1404. The vSwitch may be a pure software vSwitch (e.g., a shared memory vSwitch), which may be optimized so that data are not moved between memory locations, but rather, the data may stay in one place, and pointers may be passed between VMs 1404 to simulate data moving between ingress and egress ports of the vSwitch. The vSwitch may also include a hardware driver (e.g., a hardware network interface IP block that switches traffic, but that connects to virtual ports rather than physical ports). In this illustration, a distributed vSwitch 1422 is illustrated, wherein vSwitch 1422 is shared between two or more physical hardware platforms 1402.

Figure 15:
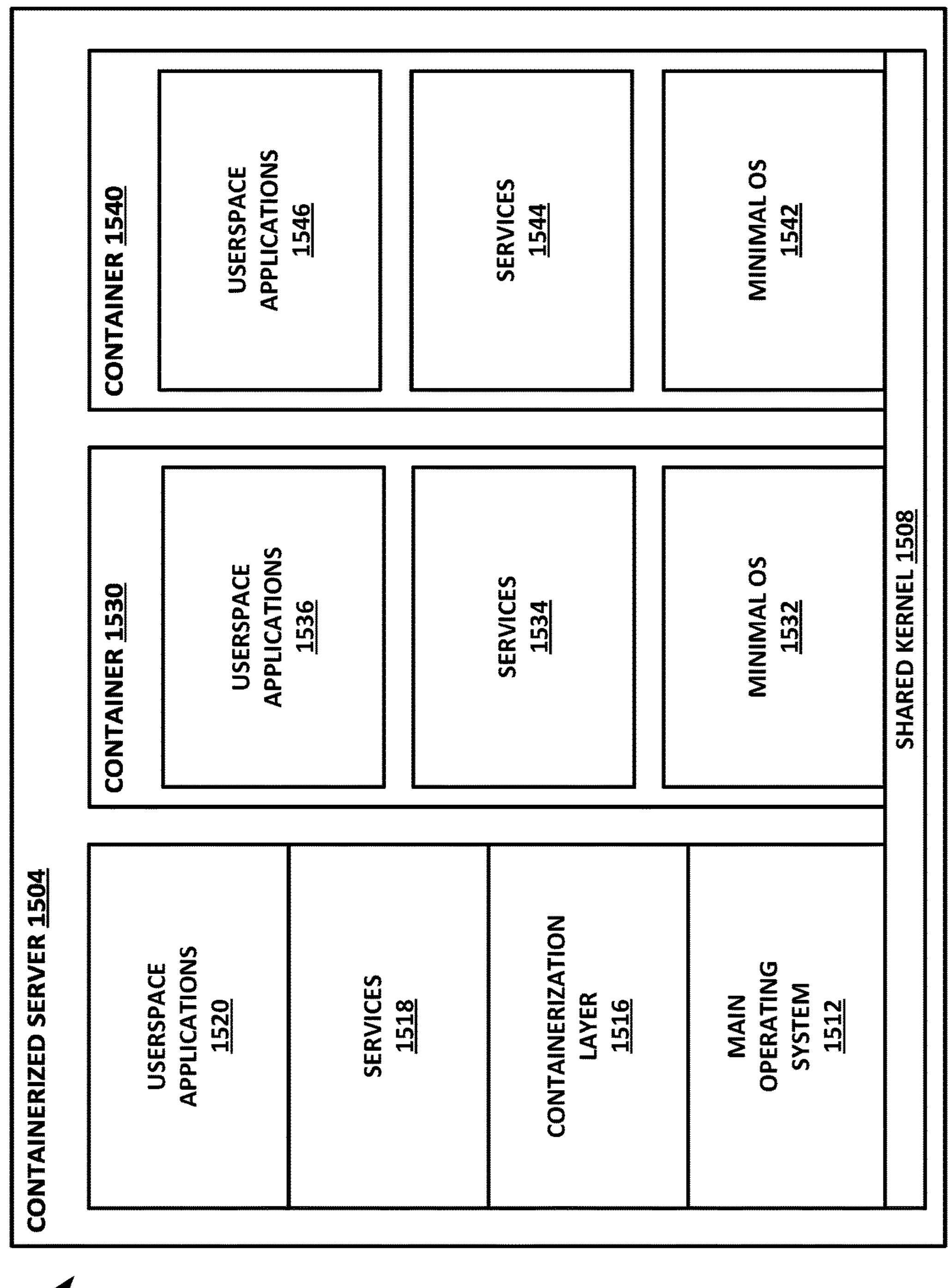
FIG. 15 is a block diagram of selected elements of a containerization infrastructure.

FIG. 15 is a block diagram of selected elements of a containerization infrastructure 1500. Like virtualization, containerization is a popular form of providing a guest infrastructure. Various functions described herein may be containerized. For example, any of the compute functions of FIGS. 1-12 may be virtualized.

Containerization infrastructure 1500 runs on a hardware platform such as containerized server 1504. Containerized server 1504 may provide processors, memory, one or more network interfaces, accelerators, and/or other hardware resources.

Running on containerized server 1504 is a shared kernel 1508. One distinction between containerization and virtualization is that containers run on a common kernel with the main operating system and with each other. In contrast, in virtualization, the processor and other hardware resources are abstracted or virtualized, and each virtual machine provides its own kernel on the virtualized hardware.

Running on shared kernel 1508 is main operating system 1512. Commonly, main operating system 1512 is a Unix or Linux-based operating system, although containerization infrastructure is also available for other types of systems, including Microsoft Windows systems and Macintosh systems. Running on top of main operating system 1512 is a containerization layer 1516. For example, Docker is a popular containerization layer that runs on a number of operating systems, and relies on the Docker daemon. Newer operating systems (including Fedora Linux 32 and later) that use version 2 of the kernel control groups service (cgroups v2) feature appear to be incompatible with the Docker daemon. Thus, these systems may run with an alternative known as Podman that provides a containerization layer without a daemon.

Various factions debate the advantages and/or disadvantages of using a daemon-based containerization layer (e.g., Docker) versus one without a daemon (e.g., Podman). Such debates are outside the scope of the present specification, and when the present specification speaks of containerization, it is intended to include any containerization layer, whether it requires the use of a daemon or not.

Main operating system 1512 may also provide services 1518, which provide services and interprocess communication to userspace applications 1520.

Services 1518 and userspace applications 1520 in this illustration are independent of any container.

As discussed above, a difference between containerization and virtualization is that containerization relies on a shared kernel. However, to maintain virtualization-like segregation, containers do not share interprocess communications, services, or many other resources. Some sharing of resources between containers can be approximated by permitting containers to map their internal file systems to a common mount point on the external file system. Because containers have a shared kernel with the main operating system 1512, they inherit the same file and resource access permissions as those provided by shared kernel 1508. For example, one popular application for containers is to run a plurality of web servers on the same physical hardware. The Docker daemon provides a shared socket, docker.sock, that is accessible by containers running under the same Docker daemon. Thus, one container can be configured to provide only a reverse proxy for mapping hypertext transfer protocol (HTTP) and hypertext transfer protocol secure (HTTPS) requests to various containers. This reverse proxy container can listen on docker.sock for newly spun up containers. When a container spins up that meets certain criteria, such as by specifying a listening port and/or virtual host, the reverse proxy can map HTTP or HTTPS requests to the specified virtual host to the designated virtual port. Thus, only the reverse proxy host may listen on ports 80 and 443, and any request to subdomain1.example.com may be directed to a virtual port on a first container, while requests to subdomain2.example.com may be directed to a virtual port on a second container.

Other than this limited sharing of files or resources, which generally is explicitly configured by an administrator of containerized server 1504, the containers themselves are completely isolated from one another. However, because they share the same kernel, it is relatively easier to dynamically allocate compute resources such as CPU time and memory to the various containers. Furthermore, it is common practice to provide only a minimum set of services on a specific container, and the container does not need to include a full bootstrap loader because it shares the kernel with a containerization host (i.e. containerized server 1504).

Thus, "spinning up" a container is often relatively faster than spinning up a new virtual machine that provides a similar service. Furthermore, a containerization host does not need to virtualize hardware resources, so containers access those resources natively and directly. While this provides some theoretical advantages over virtualization, modern hypervisors—especially type 1, or "bare metal," hypervisors—provide such near-native performance that this advantage may not always be realized.

In this example, containerized server 1504 hosts two containers, namely container 1530 and container 1540.

Container 1530 may include a minimal operating system 1532 that runs on top of shared kernel 1508. Note that a minimal operating system is provided as an illustrative example, and is not mandatory. In fact, container 1530 may perform as full an operating system as is necessary or desirable. Minimal operating system 1532 is used here as an example simply to illustrate that in common practice, the minimal operating system necessary to support the function of the container (which in common practice, is a single or monolithic function) is provided.

On top of minimal operating system 1532, container 1530 may provide one or more services 1534. Finally, on top of services 1534, container 1530 may also provide userspace applications 1536, as necessary.

Container 1540 may include a minimal operating system 1542 that runs on top of shared kernel 1508. Note that a minimal operating system is provided as an illustrative example, and is not mandatory. In fact, container 1540 may perform as full an operating system as is necessary or desirable. Minimal operating system 1542 is used here as an example simply to illustrate that in common practice, the minimal operating system necessary to support the function of the container (which in common practice, is a single or monolithic function) is provided.

On top of minimal operating system 1542, container 1540 may provide one or more services 1544. Finally, on top of services 1544, container 1540 may also provide userspace applications 1546, as necessary.

Using containerization layer 1516, containerized server 1504 may run discrete containers, each one providing the minimal operating system and/or services necessary to provide a particular function. For example, containerized server 1504 could include a mail server, a web server, a secure shell server, a file server, a weblog, cron services, a database server, and many other types of services. In theory, these could all be provided in a single container, but security and modularity advantages are realized by providing each of these discrete functions in a discrete container with its own minimal operating system necessary to provide those services.

The foregoing outlines features of several embodiments so that those skilled in the art may better understand various aspects of the present disclosure. The foregoing detailed description sets forth examples of apparatuses, methods, and systems relating to targeted clustering according to one or more embodiments of the present disclosure. Features such as structure(s), function(s), and/or characteristic(s), for example, are described with reference to one embodiment as a matter of convenience; various embodiments may be implemented with any suitable one or more of the described features.

As used throughout this specification, the phrase "an embodiment" is intended to refer to one or more embodiments. Furthermore, different uses of the phrase "an embodiment" may refer to different embodiments. The phrases "in another embodiment" or "in a different embodiment" refer to an embodiment different from the one previously described, or the same embodiment with additional features. For example, "in an embodiment, features may be present. In another embodiment, additional features may be present." The foregoing example could first refer to an embodiment with features A, B, and C, while the second could refer to an embodiment with features A, B, C, and D, with features, A, B, and D, with features, D, E, and F, or any other variation.

In the foregoing description, various aspects of the illustrative implementations may be described using terms commonly employed by those skilled in the art to convey the substance of their work to others skilled in the art. It will be apparent to those skilled in the art that the embodiments disclosed herein may be practiced with only some of the described aspects. For purposes of explanation, specific numbers, materials, and configurations are set forth to provide a thorough understanding of the illustrative implementations. In some cases, the embodiments disclosed may be practiced without specific details. In other instances, well-known features are omitted or simplified so as not to obscure the illustrated embodiments.

For the purposes of the present disclosure and the appended claims, the article "a" refers to one or more of an item. The phrase "A or B" is intended to encompass the "inclusive or," e.g., A, B, or (A and B). "A and/or B" means A, B, or (A and B). For the purposes of the present disclosure, the phrase "A, B, and/or C" means A, B, C, (A and B), (A and C), (B and C), or (A, B, and C).

The embodiments disclosed can readily be used as the basis for designing or modifying other processes and structures to carry out the teachings of the present specification. Any equivalent constructions to those disclosed do not depart from the spirit and scope of the present disclosure. Design considerations may result in substitute arrangements, design choices, device possibilities, hardware configurations, software implementations, and equipment options.

As used throughout this specification, a "memory" is expressly intended to include both a volatile memory and a nonvolatile memory. Thus, for example, an "engine" as described above could include instructions encoded within a volatile or nonvolatile memory that, when executed, instruct a processor to perform the operations of any of the methods or procedures disclosed herein. It is expressly intended that this configuration reads on a computing apparatus "sitting on a shelf" in a non-operational state. For example, in this example, the "memory" could include one or more tangible, nontransitory computer-readable storage media that contain stored instructions. These instructions, in conjunction with the hardware platform (including a processor) on which they are stored may constitute a computing apparatus.

In other embodiments, a computing apparatus may also read on an operating device. For example, in this configuration, the "memory" could include a volatile or run-time memory (e.g., RAM), where instructions have already been loaded. These instructions, when fetched by the processor and executed, may provide methods or procedures as described herein.

In yet another embodiment, there may be one or more tangible, nontransitory computer-readable storage media having stored thereon executable instructions that, when executed, cause a hardware platform or other computing system, to carry out a method or procedure. For example, the instructions could be executable object code, including software instructions executable by a processor. The one or more tangible, nontransitory computer-readable storage media could include, by way of illustrative and nonlimiting example, a magnetic media (e.g., hard drive), a flash memory, a ROM, optical media (e.g., CD, DVD, Blu-Ray), nonvolatile random-access memory (NVRAM), nonvolatile memory (NVM) (e.g., Intel 3D Xpoint), or other nontransitory memory.

There are also provided herein certain methods, illustrated for example in flow charts and/or signal flow diagrams. The order or operations disclosed in these methods discloses one illustrative ordering that may be used in some embodiments, but this ordering is not intended to be restrictive, unless expressly stated otherwise. In other embodiments, the operations may be carried out in other logical orders. In general, one operation should be deemed to necessarily precede another only if the first operation provides a result required for the second operation to execute. Furthermore, the sequence of operations itself should be understood to be a nonlimiting example. In appropriate embodiments, some operations may be omitted as unnecessary or undesirable. In the same or in different embodiments, other operations not shown may be included in the method to provide additional results.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected elements. Such elements are selected to illustrate specific information to facilitate the description. The inclusion of an element in the FIGURES is not intended to imply that the element must appear in the disclosure, as claimed, and the exclusion of certain elements from the FIGURES is not intended to imply that the element is to be excluded from the disclosure as claimed. Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

To aid the United States Patent and Trademark Office (USPTO) and, any readers of any patent or publication flowing from this specification, the Applicant: (a) does not intend any of the appended claims to invoke paragraph (f) of 35 U.S.C. section 112, or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

What is claimed is:

1. A computer-implemented method of classifying a target sample, wherein the target sample is a computer object having a feature vector, the method comprising:

creating n sorted containers, comprising sorting a universe of samples based on feature vector distances from the samples to n vantage points, wherein n is a positive integer;

storing the n sorted containers to a computer memory;

bucketizing the n sorted containers;

for the n vantage points, selecting, from the n bucketized sorted containers, n meta-buckets of that the target sample belongs to;

creating an intersection container, comprising samples that appear in all n meta-buckets;

selecting, as a target cluster, samples from the intersection container that have a feature vector distance from the target sample less than a threshold; and acting on the target cluster.

2. The method of claim 1, wherein n=1.

3. The method of claim 1, wherein n>1.

4. The method of claim 1, wherein n=3.

5. The method of claim 1, wherein the feature vector distances are locality sensitive hashing (LSH) compliant distances.

6. The method of claim 5, wherein the LSH compliant distances are TLSH distances.

7. The method of claim 1, wherein the n meta buckets comprise buckets that have a range that includes distances from the target sample to the n vantage points.

8. The method of claim 1, wherein the n meta buckets comprise buckets that have a range that includes distances from the target sample to the n vantage points, plus one or more adjacent buckets.

9. The method of claim 8, wherein selecting the n meta-buckets comprises consolidating buckets that the target sample belongs to with respective adjacent buckets.

10. The method of claim 1, wherein the n meta buckets comprise buckets that have a range that includes distances from the target sample to the n vantage points, plus a nearest adjacent bucket.

11. The method of claim 1, wherein selecting samples from the intersection container comprises sorting the intersection container based on distance from the target sample, iterating through samples until a terminal sample is reached that has a feature vector distance greater than the threshold, and discarding the terminal sample from the target cluster.

12. The method of claim 1, wherein sorting the intersection container based on distance from the target sample comprises computing locality-sensitive hashing (LSH) compliant distances between the samples of the intersection container and the target sample.

13. The method of claim 1, wherein acting on the target cluster comprises assigning to the target sample a common label of samples in the target cluster.

14. The method of claim 1, wherein acting on the target cluster comprises assigning to the target sample a majority label of samples in the target cluster.

15. One or more tangible, nontransitory computer-readable storage media having stored thereon executable instructions to classify a target sample, wherein the target sample is a computer object having a feature vector, the instructions to:

create n sorted containers, comprising sorting a universe of samples based on feature vector distances from the samples to n vantage points, wherein n is a positive integer;

bucketize the n sorted containers;

for the n vantage points, select, from the n bucketized sorted containers, n meta- buckets of that the target sample belongs to;

create an intersection container, comprising samples that appear in all n meta- buckets;

select, as a target cluster, samples from the intersection container that have a feature vector distance from the target sample less than a threshold; and act on the target cluster.

16. The one or more tangible, nontransitory computer-readable storage media of claim 15, wherein the n meta buckets comprise buckets that have a range that includes distances from the target sample to the n vantage points, plus one or more adjacent buckets, and wherein selecting the n meta-buckets comprises consolidating buckets that the target sample belongs to with respective adjacent buckets.

17. The one or more tangible, nontransitory computer-readable storage media of claim 15, wherein selecting samples from the intersection container comprises sorting the intersection container based on distance from the target sample, iterating through samples until a terminal sample is reached that has a feature vector distance greater than the threshold, and discarding the terminal sample from the target cluster.

18. A computing apparatus, comprising:

one or more hardware platforms, comprising one or more processor circuits and one or more memories; and instructions encoded within the one or more memories to instruct the one or more processor circuits to:

create n sorted containers, comprising sorting a universe of samples based on feature vector distances from the samples to n vantage points, wherein n is a positive integer;

bucketize the n sorted containers;

for the n vantage points, select, from the n bucketized sorted containers, n meta-buckets that a target sample belongs to;

create an intersection container, comprising samples that appear in all n meta-buckets;

select, as a target cluster, samples from the intersection container that have a feature vector distance from the target sample less than a threshold; and act on the target cluster.

19. The computing apparatus of claim 18, further comprising a virtualization infrastructure.

20. The computing apparatus of claim 18, further comprising a containerization infrastructure.

* * * * *